United States Patent
Perez Martinez et al.

(10) Patent No.: US 9,900,218 B2
(45) Date of Patent: Feb. 20, 2018

(54) METHOD, USER TERMINAL, AND POLICY AND CHARGING NETWORK ENTITY FOR CLASSIFYING PACKETS

(75) Inventors: Alfonso de Jesus Perez Martinez, Madrid (ES); Rodrigo Alvarez Dominguez, Madrid (ES); Stuart Clark, Santa Clara, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 457 days.

(21) Appl. No.: 14/403,510

(22) PCT Filed: May 31, 2012

(86) PCT No.: PCT/EP2012/060268
§ 371 (c)(1),
(2), (4) Date: Nov. 24, 2014

(87) PCT Pub. No.: WO2013/178273
PCT Pub. Date: Dec. 5, 2013

(65) Prior Publication Data
US 2015/0222489 A1    Aug. 6, 2015

(51) Int. Cl.
*H04L 12/24*    (2006.01)
*H04W 48/16*    (2009.01)
(Continued)

(52) U.S. Cl.
CPC ........ *H04L 41/0893* (2013.01); *H04L 43/028* (2013.01); *H04M 15/66* (2013.01);
(Continued)

(58) Field of Classification Search
CPC . H04W 48/16; H04W 28/0268; H04W 24/02; H04L 43/028; H04L 41/0893; H04M 15/66
See application file for complete search history.

(56) References Cited

U.S. PATENT DOCUMENTS

| | | | |
|---|---|---|---|
| 2007/0093243 A1 | 4/2007 | Kapadekar et al. | |
| 2009/0304015 A1* | 12/2009 | Willars | H04L 12/5695 370/412 |
| 2013/0308450 A1* | 11/2013 | Zhou | H04W 12/08 370/230 |

FOREIGN PATENT DOCUMENTS

| | | |
|---|---|---|
| EP | 1315396 A1 | 5/2003 |
| WO | 2011012165 A1 | 2/2011 |

OTHER PUBLICATIONS

Author Unknown, "Technical Specification Group Services and System Aspects; Vocabulary for 3GPP Specifications (Release 7)," Technical Report 21.905, Version 7.4.0, 3GPP Organizational Partners, Jun. 2007, 55 pages.

(Continued)

*Primary Examiner* — Gbemileke J Onamuti
(74) *Attorney, Agent, or Firm* — Withrow & Terranova, PLLC

(57) ABSTRACT

A method for classifying packets includes determining an execution indication indicating at least one amongst a service and application being executed on a user terminal and generating uplink packets; determining a marker on the basis of PCC rules available at the user terminal and at least one execution indication, the marker for identifying at least one of a service and an application associated to uplink packets; transmitting the marker and the uplink packets, to a PCEF network entity; determining an uplink classification, at the PCEF network entity, for received uplink packets based on the marker; storing, at said PCEF network entity, an association between information related to an uplink flow corresponding to the uplink packets and uplink classification; receiving, at said PCEF network entity, downlink packets corresponding to the uplink packets; determining a downlink classification, at the PCEF network entity, for received downlink packets based on the stored association.

26 Claims, 14 Drawing Sheets

(51) Int. Cl.
*H04M 15/00* (2006.01)
*H04W 28/02* (2009.01)
*H04L 12/26* (2006.01)
*H04W 24/02* (2009.01)
*H04W 48/02* (2009.01)

(52) U.S. Cl.
CPC ....... *H04W 24/02* (2013.01); *H04W 28/0268* (2013.01); *H04W 48/16* (2013.01); *H04W 48/02* (2013.01)

(56) References Cited

OTHER PUBLICATIONS

Author Unknown, "Technical Specification Group Services and System Aspects; Policy and charging control architecture (Release 9)," Technical Specification 23.203, Version 9.11.0, 3GPP Organizational Partners, Mar. 2012, 124 pages.
Author Unknown, "Technical Specification Group Core Network and Terminals; Policy and Charging Control (PCC) over Gx reference point (Release 9)," Technical Specification 29.212, Version 9.10.0, 3GPP Organizational Partners, Mar. 2012, 119 pages.
Calhoun, P. et al., "RFC 3588: Diameter Base Protocol," The Internet Society, Sep. 2003, 147 pages.
International Search Report and Written Opinion for PCT/EP2012/060268, dated Feb. 22, 2013, 13 pages.

* cited by examiner

WITHOUT INVENTION

WITH INVENTION

METHOD, USER TERMINAL, AND POLICY AND CHARGING NETWORK ENTITY FOR CLASSIFYING PACKETS

This application is a 35 U.S.C. § 371 national phase filing of International Application No. PCT/EP2012/060268, filed May 31, 2012, the disclosure of which is incorporated herein by reference in its entirety.

TECHNICAL FIELD

The present invention relates in general to classifying packets, more specifically to classifying packets within a Policy and Charging Control architecture, and in particular to classifying uplink packets and corresponding downlink packets, associated with an application or service, being executed at a user terminal. The present invention relates to a user terminal, a PCEF network entity, a PCRF network entity, a communication system thereof, and corresponding methods.

TECHNICAL BACKGROUND

In the context of communication networks, such as telecommunication networks, network operators often want to define and enforce a set of rules in the network. A set of rules constitutes policies. A policy framework for managing and enforcing these policies usually includes three elements, or functions: a policy repository for storing the policy rules which may be user-specific, a policy decision element, function or point, and a policy enforcement element, function or point. The purposes of a policy framework include controlling subscriber access to the networks and services.

A policy framework notably addresses the decisions as to whether the subscriber is entitled, or authorized, to enjoy a service that may be invoked by an application being executed on a user terminal, and whether the network can provide the service to the subscriber.

Policy and charging control architectures, such as, but not limited to, the architecture described in 3GPP TS 23.203. Technical Specification Group Services and System Aspects, Policy and charging control architecture (Release 9) (available on http://www.3gpp.org), integrate the policy and charging control.

Policy and Charging Control (PCC) architecture permits to integrate both policy and charging control, optimizing the information flow. The architecture that supports Policy and Charging Control functionality is shown in FIG. 1 and is in accordance with TS 23.203, which specifies the PCC functionality for Evolved 3GPP Packet Switched domain, including both 3GPP accesses (GERAN/UTRAN/E-UTRAN) and Non-3GPP accesses. In the following, an explanation of the main elements of such architecture will be provided.

The Application Function (AF) is an element offering applications in which service is delivered in a different layer (i.e. transport layer) from the one the service has been requested (i.e. signaling layer), the control of IP bearer resources according to what has been negotiated. One example of an AF is the P-CSCF of the IM CN subsystem. The AF shall communicate with the PCRF (Policy and Charging Rules Function) to transfer dynamic session information (i.e. description of the media to be delivered in the transport layer). This communication is performed using the Rx interface. The information in the Rx interface is derived from the session information in the P-CSCF (e.g. SDP when SIP is used for signalling) and it mainly includes what is called media components. A media component is composed by a set of IP flows, each one described through a 5-tuple, the media type and bandwidth required.

The PCRF (Policy and Charging Rules Function) is a functional element that performs policy control decisions and flow based charging control. The PCRF therefore provides network control regarding the service data flow detection, gating, QoS and flow based charging (except credit management) towards the PCEF (Policy Control Enforcement Function). In particular, the PCRF may include a function that provides policy and charging control for the Media Components negotiated between the user terminal (UE) and the AF. For that purpose, the PCRF creates PCC rules based on the information received from the Rx interface. PCRF, depending on the user and the requested service and/or application, include charging and policy information along with the set of IP filter information: each IP 5-tuple is composed of source and destination IP address and ports, and the protocol id above IP (TCP, UDP). The filters included in PCC rules define what is called Service Data Flows (SDF), i.e. data flows that are treated in the same way regarding policy and charging. This Service Data Flows are installed in PCEF (Policy Control Enforcement Function) through the Gx interface. The Gx reference point is further defined in 3GPP TS 29.212 and lies between the PCRF and the PCEF.

The PCEF (Policy Control Enforcement Function) encompasses service data flow detection based on the filters definitions included in the PCC rules, as well as online and offline charging interactions (not described here) and policy enforcement. The PCEF may further encompass policy enforcement and flow based charging functionalities. Since the PCEF is the one handling the bearers, this is where the QoS is being enforced for the bearer according to the QoS information coming from the PCRF. This functional entity is located at the Gateway (e.g. GGSN in the GPRS case, and PDG in the WLAN case).

Deep packet inspection (DPI) technology, embedded in PCEF, supports packet inspection and service classification, whereby packets, such as IP packets, are classified according to a configured tree of rules so that they are assigned to a particular service session. DPI technology can be also provided in a standalone node, the so/called Traffic Detection Function specified by TS 23.203, as an element of the PCC architecture.

Moreover, DPI technology offers two types of analysis, namely shallow packet inspection and deep packet inspection. Shallow packet inspection extracts basic protocol information, such as IP addresses (source, destination) and other low-level connection states. This extracted information resides in the packet header itself and consequently reveals the principal communication intent. Deep packet inspection, on the other hand, provides application awareness. This is achieved by analysing the content in both the packet header and the payload over a series of packet transactions. There are several possible methods of analysis used to identify and classify applications and/or protocols that are grouped into signatures. One of these methods deals with heuristic signatures which are related to the behavioural analysis of user traffic.

In the PCC architecture, the policy control includes the QoS control. The PCEF enforces the authorized QoS for an IP-CAN bearer according to the information received via the Gx interface and depending on the bearer establishment mode. The IP-CAN (IP Connectivity Access Network) sits between the RAN (Radio Access Network) and the CN (Core Network). Here, the PCC architecture may take decisions according to the type of IP-CAN used. The enforcement of the authorized QoS of the IP-CAN bearer may lead to a downgrading or upgrading of the requested bearer QoS by the PCEF as part of a UE-initiated IP-CAN bearer establishment or modification. Alternatively, the enforcement of the authorised QoS may, depending on operator policy and network capabilities, lead to network initiated IP-CAN bearer establishment or modification. If the PCRF provides authorized QoS for both, the IP-CAN bearer and PCC rule(s), the enforcement of authorized QoS of the individual PCC rules shall take place first.

At IP-CAN session establishment or modification, the PCEF requests the policy rules to the PCRF. In the case that due to the size of the network, several PCRFs are deployed in different sites, the standard defines the DRA functional entity.

The DRA functional entity is defined in the 3GPP standards for PCRF discovery procedures where more than one PCRF is present in an operator's network. It proposes to use Diameter routing procedures using the NAI domain part. This solution assumes that the operator deployment uses one realm per site and that the NAI is used in the network.

Routing of Diameter messages from a network element towards the right Diameter realm in a PLMN is based on standard Diameter realm-based routing, as specified in IETF RFC 3588 using the UE-NAI domain part.

The DRA is defined in 3GPP to support the functionality of a proxy agent and a redirect agent as defined in RFC 3588.

The SPR (Subscriber Profile Register) entity contains all subscriber/subscription related information needed for subscription-based policies and IP-CAN bearer level rules by the PCRF.

Problems with Existing Solutions

User terminals, such as smartphones, tablets and the like, may execute applications and/or use services while being constantly connected to a mobile network. These applications and/or services may apply proprietary protocols or attempt to mimic other well-known protocols. In many occasions, these applications and/or services use encrypted traffic, for example for security reasons. These factors make packet analysis and classification using DPI, for example based on Deep Packet Inspection, not only difficult if not impossible but also very costly from a system resources perspective.

DPI-technologies use heuristic analyzers that detect and identify these protocols based on at least one of heuristic signatures, binary signature patterns, metrics and connectivity patterns. The difficulty of correctly identifying and classifying this type of encrypted traffic means that the application/protocol/service identification accuracy cannot be guaranteed. A higher percentage of encrypted packets therefore leads to lower detection rates.

These DPI techniques therefore facilitate fraud, as traffic may be appropriately encrypted in an attempt to avoid correct analysis and classification of the corresponding service/application/protocol. In addition, this may also obviate the customers charging model.

In addition, many users use tethering to share the internet connection of their mobile phone with their laptops. This avoids paying for separate mobile broadband services or buying additional hardware in order to connect the laptop to the network. From an operator point of view, this is problematic, as users can now use low cost flat rate mobile connections with their home laptops, thus contributing to congestion at the mobile connection interfaces. DPI-techniques designed to detect tethering do not, however, guarantee a 100% detection rate.

In all these cases PCEF network entities apply a heuristic analysis based on heuristic signatures, for example a set of empirical patterns characteristic of a particular protocol or application or service. Each time a user is connected to the network and generates traffic, the PCEF network entity may attempt, based on DPI or the like, to analyze a packet by searching for a possible protocol and hence determining the corresponding application or service.

This additionally creates the following problems:

The number of new protocols and applications and services increases every year. Consequently the current detection protocol mechanisms have to be updated according to the state of the art of the internet protocols in a dynamic way. Therefore, the probability of incorrect protocol detection increases as a consequence of new protocols and applications and services developed every year.

Moreover, a heuristic traffic analyzer applied by the PCEF network entities makes a best guess classification but identification accuracy is not guaranteed to be 100%. This limitation is inherent in the heuristic approach. This type of analysis that keeps track of the behavioral analysis of the packets requires also a highly consuming CPU because more than one packet has to be taken into account for its analysis. Therefore, a heuristic analysis is not suitable from a technical point of view, but also in connection with charging applications.

On the other hand although PCEF network entities from some vendors have a high detection rate for some protocols and applications and services, the number of supported protocols or applications or services is really limited. Internet applications change almost monthly. There are new tendencies, fashions, websites that are changing rapidly. Even the same application or protocols or services are not popular in all countries. For example, many countries have local popular applications (Tencent QQ in China, Windows. Live Messaging in Spain or Skype in Germany) with specific proprietary protocols.

The effort necessary to update these protocols and to collect new popular applications or services is very costly and inefficient. In some cases due to the unbelievable number of existing applications as for example applications downloaded from the Apple Store or Android Market, this makes it almost unfeasible to include them as supported application in any PCEF network entity. Also, it has to be considered that a PCEF network entity is the single point of analysis and/or classification of all services and applications of all users in the core network. Those activities require a high amount of resources, as they consume a high CPU, for example. Moreover, the PCEF network entity has to be interoperable with other elements like a PCRF entity of charging systems so it has become a bottleneck in the overall PCC architecture.

For all these reasons, PCC functions are limited in these applications or services and it cannot be guaranteed that they can correctly be applied for a single user and a specific application or service. The operator has to assume that many PCC functions will apply in best effort or will never be able to be applied. Examples of these applications are Skype, Instant messaging, TV online (Zattoo, Pandora, Slacker), Iphone or android applications, P2P applications (Emule, BitTorrent), SIP, RTSP, online games. Examples of services are VoIP, instant messaging, file transfer and the like.

Operators are also really interested in knowing when users share their Internet connection of an Internet-capable mobile phone with other devices. Tethering is a term responsible of analyzing this technology in which mobile phone is working as a modem. From an analysis perspective, it is very hard with DPI to analyze when subscribers are using tethering.

In summary, currently one of the core of mobile network operators is precisely the privileged access to new Internet tendencies, videos, fashion applications or websites or TV over IP channels. There is therefore an urgent and critical need to improve the bandwidth and access to these services. While the current PCC solution allows to detect, to classify, to improve their QoS, or to also charge the applications, this approach is based on a heuristic analysis that is intrinsically limited and has a low efficiency.

It is therefore desirable to provide improved methods, network entities, system, computer programs and methods to overcome, or at least mitigate the above problems.

SUMMARY OF THE PRESENT INVENTION

The object is achieved by the subject-matter of the independent claims. Advantageous embodiments are defined in the dependent claims. Further examples are provided for facilitating the understanding of the invention.

According to a first aspect of the invention, it is provided a method of classifying packets associated to at least one amongst a service and an application, the method carried out in a communication network comprising at least a user terminal and a PCEF network entity, the method comprising the steps of: determining, at said user terminal, at least one execution indication indicating said at least one amongst said service and application being executed on said user terminal and generating uplink packets; determining, at said user terminal, a marker on the basis of mobile PCC rules available at said user terminal and said at least one execution indication, said marker for identifying at least one amongst a service and an application associated to said uplink packets; transmitting, at said user terminal, said marker and said uplink packets, to said PCEF network entity; determining an uplink classification, at said PCEF network entity, for received uplink packets based on said marker; storing, at said PCEF network entity, an association between information related to an uplink flow corresponding to said uplink packets and said uplink classification; receiving, at said PCEF network entity, downlink packets corresponding to said uplink packets; determining a downlink classification, at said PCEF network entity, for received downlink packets based on said stored association.

According to a second aspect of the invention, it is provided a user terminal for classifying packets associated to at least one amongst a service and an application, said user terminal further adapted to communicate with a PCEF network entity, said user terminal comprising: an execution determinator for determining at least one execution indication indicating said at least one amongst said service and application being executed on said user terminal and generating uplink packets; a marker determinator for determining a marker on the basis of mobile PCC rules available at said user terminal and said at least one execution indication, said marker for identifying at least one amongst a service and an application associated to said uplink packets; a transmitter for transmitting said marker and said uplink packets, to a PCEF network entity.

According to a third aspect of the invention, it is provided a method for classifying packets associated to at least one amongst a service and an application, said method carried out at a user terminal, the method comprising the steps of: determining at least one execution indication indicating said at least one amongst said service and application being executed on said user terminal and generating uplink packets; determining a marker on the basis of mobile PCC rules available at said user terminal and said at least one execution indication, said marker for identifying at least one amongst a service and an application associated to said uplink packets; transmitting said marker and said uplink packets, to a PCEF network entity.

According to a fourth aspect of the invention, it is provided a PCEF network entity adapted to perform policy and charging enforcement functions, said PCEF network entity further adapted to communicate with a user terminal capable of executing at least one amongst a service and an application, said PCEF network entity comprising: an uplink receiver for receiving, from said user terminal entity, uplink packets and a marker, said marker for identifying said at least one amongst a service and an application associated to said uplink packets, said marker being further dependent on mobile PCC rules available at said user terminal entity and on at least one amongst said service and application being executed on said user terminal; an uplink classification determinator for determining an uplink classification for received uplink packets based on said marker; a memory for storing an association between information related to an uplink flow corresponding to said uplink packets and said uplink classification; a downlink receiver for receiving downlink packets corresponding to said uplink packets; a downlink determinator for determining a downlink classification, at said PCEF network entity, for received downlink packets based on said stored association.

According to a fifth aspect of the invention, it is provided a method for performing policy and charging enforcement functions, said method carried out at a PCEF network entity adapted to communicate with a user terminal capable of executing at least one amongst a service and an application, said method comprising the steps of: receiving, from said user terminal entity, uplink packets and a marker, said marker for identifying said at least one amongst a service and an application associated to said uplink packets, said marker being further dependent on mobile PCC rules available at said user terminal entity and on at least one amongst said service and application being executed on said user terminal; determining an uplink classification, at said PCEF network entity, for received uplink packets based on said marker; storing, at said PCEF network entity, an association between information related to an uplink flow corresponding to said uplink packets and said uplink classification; receiving, at said PCEF network entity, downlink packets corresponding to said uplink packets; determining a downlink classification, at said PCEF network entity, for received downlink packets based on said stored association.

According to a sixth aspect of the invention, it is provided a PCRF network entity for performing policy and charging rules function, comprising: a generating unit for generating PCC rules to be used at a PCEF network entity and mobile PCC rules to be used at a user terminal, said mobile PCC rules comprising mobile PCC rules and guidelines for allowing a user terminal to determine whether at least one amongst a service and an application is executed on said user terminal entity; allowing a user terminal to determine a marker for identifying said at least one amongst a service and an application associated to uplink packets; and a transmitter for transmitting said PCC rules and said mobile PCC rules to at least one amongst a PCEF network entity and a user terminal.

According to a seventh aspect of the invention, it is provided a system for classifying packets associated to at least one amongst a service and an application, comprising a user terminal according to the second aspect of the invention, a PCEF network entity adapted to perform policy and charging enforcement functions according to the fourth aspect of the invention, and a PCRF network entity for performing policy and charging rules function according to the sixth aspect of the invention.

According to an eight aspect of the invention, it is provided a computer program product comprising program parts arranged for conducting the method according to the first aspect of the invention, according to the third aspect of the invention, or according to the fifth aspect of the invention.

DETAILED DESCRIPTION

The present invention shall now be described in conjunction with specific embodiments by making reference to the drawings. It is however noted that these specific embodiments as well as the illustrative figures serve to provide the skilled person with a better understanding of the invention but are not intended to restrict in anyway the scope of the invention which is defined by the independent claims.

Figure 1:
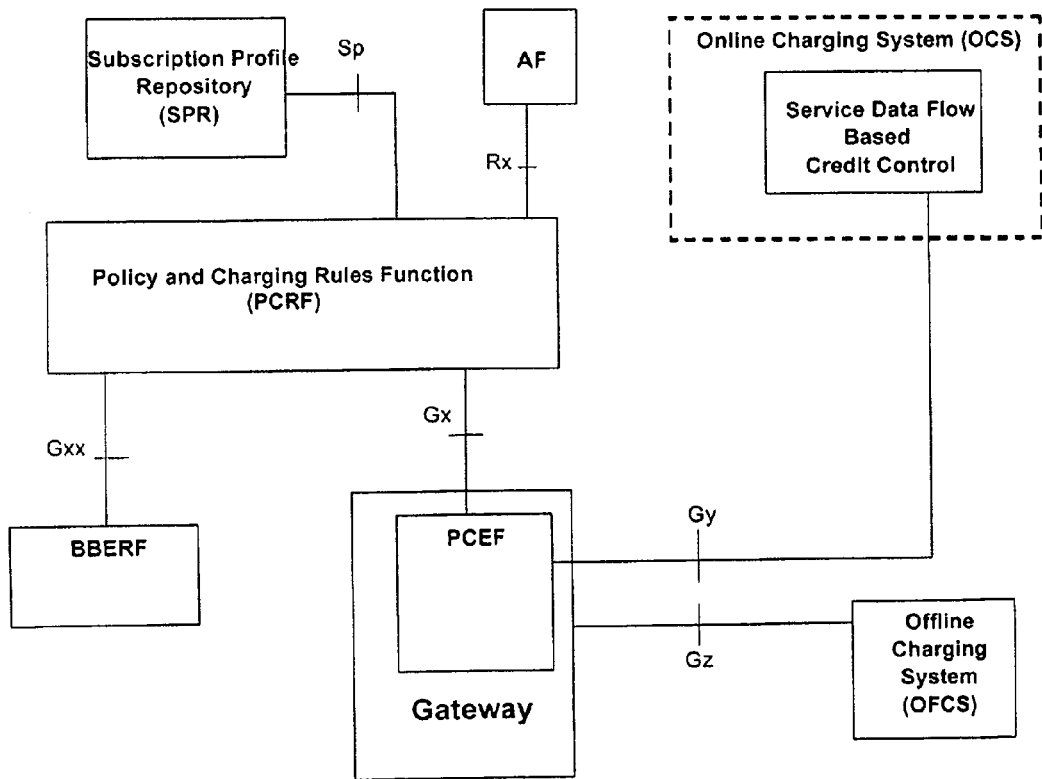
FIG. 1 illustrates a policy and charging control PCC architecture according to the state of the art.
Figure 2:
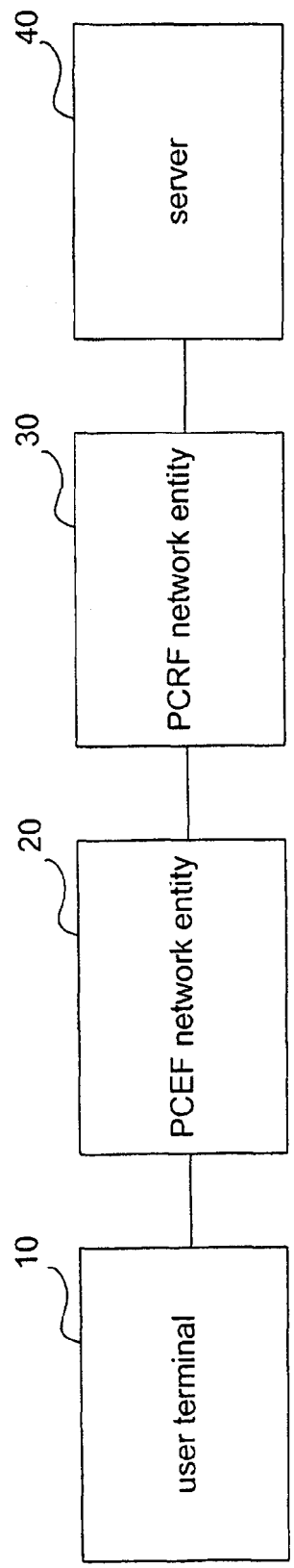
FIG. 2 illustrates a network architecture to which the present invention may be applied.

FIG. 2 represents an illustrative non-restrictive example of a network architecture to which the present invention may be applied. As it can be seen, such a communication network comprises at least a user terminal 10 and a PCEF network entity 20. In addition, the communication network may also comprise a PCRF network entity 30 and a server 40.

The user terminal 10, such as a smartphone, a mobile phone, a mobile computing device, a portable communication device, a tablet PC, or the like, may run applications that may be constantly connected to the mobile network. An application is a specific software program, for example Skype that may invoke one or more specific services, such as VoIP, instant messaging, file transfer, etc. A service may also refer to a specific software program (or to a combination of programs or to combinations thereof), and may be a component of a portfolio of choices offered by service providers to a user of the user terminal and thus a functionality offered to a user. A service offered to a user may be described by a set of performance parameters and their specific values, limits or ranges. The set of parameters provides a comprehensive description of the service capabilities. A service may thus provide functional capabilities for applications being executed at the user terminal, as for example the VoIP service provides functional capabilities for Skype, Windows Live Messenger, Fring, iTalk, etc. The notation of applications and services as used here is also in line with the notation described in 3GPP 21.905 Release 7 (available on http://www.3gpp.org).

The PCEF network entity 20 (also referred to as "PCEF" for simplicity, in particular in the later disclosed examples) like the one depicted in FIG. 2 is a network entity comprising means or specifically adapted components for enforcing policy control decisions and flow based charging control as above explained and for establishing communication with the other elements of the communication network.

The PCRF network entity 30 (also referred to as "PCRF" for simplicity, in particular in the later disclosed examples) like the one depicted in FIG. 2 is a network entity comprising means or specifically adapted components for providing policy and charging rules functionalities and for establishing communication with, the other elements of the communication network.

The server 40 may be an application/service server in charge of handling the application/service, the application/service being executed at the user terminal 10. As such, the server 40 may provide corresponding downlink packets to the user terminal 10 as a response to the generation of uplink packets associated with an application/service being executed at the user terminal 10.

A method according to a first embodiment of the present invention will now be described with reference to FIG. 3. The method according to the first embodiment is for classifying packets associated to at least one amongst a service and an application being executed on the user terminal 10, and is carried out in a communication network comprising at least the user terminal 10 and the PCEF network entity 20. In other words, the present method may be applied to a configuration of a communications network as depicted in FIG. 2 comprising a user terminal 10 and a PCEF network entity 20. For illustrative purposes FIG. 2 comprises further network elements, which are, however, not necessary for performing the method according to the present embodiment.

The method comprises a step S110 of determining, at said user terminal 10, at least one execution indication which indicates said at least one amongst said service and application being executed on said user terminal 10 and generating uplink packets. As explained above, the user terminal 10 may be running an application or a service that generates uplink packets. Such uplink packets may be transmitted from the user terminal 10 to the PCEF network entity 20 for subsequent transmission to the server 40.

The execution indication may be, for example, an ID value (e.g. one or more bits) indicating a specific application or service currently being executed on the user terminal or can be the result (true/false) of a process ("IF") performed to determine whether one or more application or service are currently being executed. In addition, the execution indication may refer to a process or a thread (which indicates the corresponding application or service) or the application itself.

As such, the user terminal 10 determines an execution indication that is specific or unique to a particular application or service or to a type or family of applications or services.

The method then foresees a step S120 of determining, at said user terminal 10, a marker on the basis of mobile PCC rules (also referred to as "GPCC rules", in particular in the later disclosed examples) available at said user terminal 10 and said at least one execution indication, said marker for identifying at least one amongst a service and an application associated to said uplink packets.

The mobile PCC rules are an extension of PCC rules available at the PCEF network entity 20.

In particular, mobile PCC rules may be specific with respect to the user terminal 10 itself, for example based on the operating system of the user terminal 10.

In addition, the mobile PCC rules may by also specific to the user currently using the user terminal. For example, the mobile PCC rules may comprise information concerning requests for resources which depend on the user profile. For instance a "gold" user may obtain more resources than available to an average user. According to a further example, the mobile PCC rules may comprise information related to policy and charging control and obtained on the basis of an application to be provided to the user, e.g. the policy and charging information may be related to a session or thread corresponding to an application or corresponding service being executed on said user terminal 10.

Furthermore, the mobile PCC rules may include information as to how to identify a process or thread corresponding to an application or service being executed on the mobile terminal 10 having a specific mobile operating system. Therefore, the mobile PCC rules may be specific to the operating system of the user terminal 10 and are thus different for, e.g., an Iphone (IOS) and a Nokia mobile phone (Symbian OS).

The mobile PCC rules are available at the user terminal 10, since the mobile PCC rules may be pre-installed at the user terminal 10 or may be downloaded from the PCRF network entity 30 (or from a different network entity, like for instance a network management network entity), either directly or indirectly through the PCEF network entity 20, and/or upon request from the user terminal 10. In addition, the mobile PCC rules may be dynamically changed.

Later in the disclosure examples will be illustrated showing how said mobile PCC rules may be provided to the user terminal 10.

It is further noted that a first association is being made between uplink packets and a corresponding application or service, according to which, for example, the uplink packets are processed or output as a result of an application or service process being executed at the user terminal 10 or forwarded by the service or application.

Figure 3:
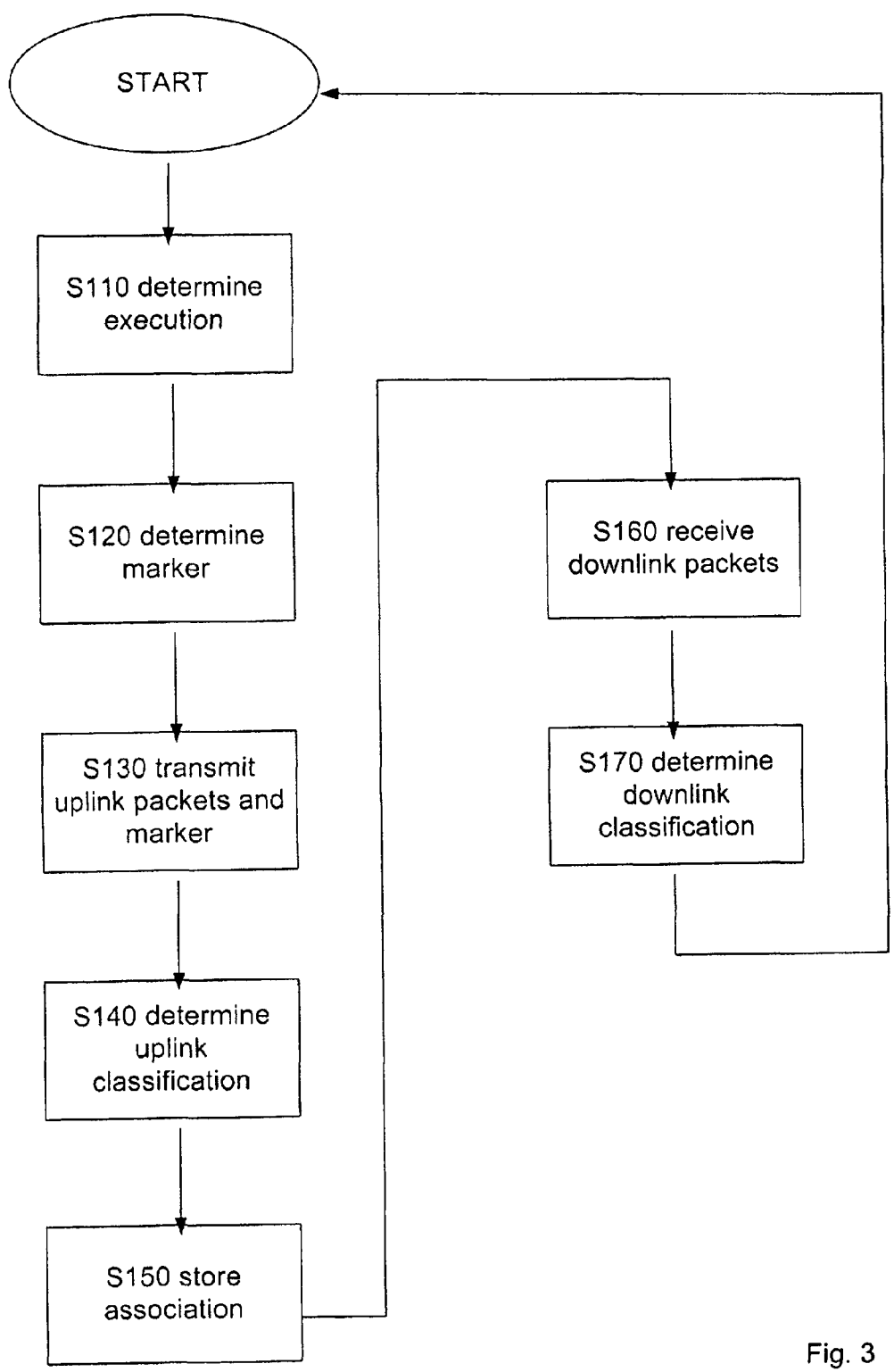
FIG. 3 illustrates a flow chart of a method according to a first embodiment of the present invention.

According to step S120 shown in FIG. 3, the user terminal 10 may then determine a marker for the generated uplink packet on the basis of the above explained mobile PCC rules and said at least one execution indication. Such a marker may be, for example, another ID value based on one or more bits for identifying an application/service that is associated with the uplink packet.

According to an example, in case the user terminal 10 determines an execution indication which indicates that Skype processes/threads are being executed on said user terminal 10 and generate uplink packets, a specific marker is determined based on the mobile PCC rules for identifying the uplink packets as being associated to Skype.

As such, the mobile PCC rules available at the user terminal provide application/service specific markers for identifying uplink packets as being associated to the application/service. Such a marker may, for example, be associated with a Type of Service (ToS) attribute corresponding to the determined application/service. For example, a ToS value of 8 may be used for Skype, while ToS value of 9 may be used when tethered uplink packets are determined.

In an alternative first example, the marker may, in addition to identifying the association of uplink packets to an application/service, may also identify a PCC service classification depending on the user. This may be based on a PCC category identifier included in the mobile PCC rules. For example, a PCC category identifier 5 may be used for a "gold" user using Skype. Based on this alternative example, the user terminal 10 may determine a first Skype marker for a "gold" user, a second Skype marker for a "silver" user, and a third Skype marker for a "bronze" user. As a result the marker may, in addition to identifying the association between uplink packets and the Skype application, also pre-classify the service for the uplink packet.

As an alternative second example, the marker may identify a PCC service classification for the user and the requested application (Skype).

In other words, the marker may be (i) a ToS value for identifying an application/process, (ii) based on a ToS value for identifying an application/process and a PCC category identifier for classifying a service, or (iii) a PCC category identifier for classifying a service.

The method then foresees a step S130 for transmitting, at said user terminal 10, said marker and said uplink packets, to said PCEF network entity 20. In this step, the determined marker may be inside or appended the uplink packets or may be sent separately from the uplink packets, for example in an interval of a predetermined number of uplink packets, for example every 100 or 1000 uplink packets, or as needed, for example, when uplink packets associated to another service or application are being transmitted.

In a non limiting example, the marker may be transmitted as a digital footprint or watermark in an uplink packet associated to a specific application or service. The digital footprint or watermark may further be based on a Type of Service (ToS) attribute indicated in the mobile PCC rules available at the user terminal 10.

In a further non limiting example, the user terminal 10 may detect the ingress/egress traffic from a process or thread and will mark uplink packets by a footprint. Here, the user terminal 10 may use the application or service name registered in the operating system installation records to identify the running process and mark the packets accordingly.

The method then foresees a step S140 for determining an uplink classification, at said PCEF network entity 20, for received uplink packets based on said marker.

According to the above described markers, the uplink classification may be such that (i) the uplink packets are classified into a PCC category based on said marker identifying the application/service, for example based on a ToS value associated with that application/service. Based on this marker, the PCEF network entity 20 may, first of all, determine the association between the uplink packets and a service or application, even for encrypted packets, without having to perform DPI techniques. As such, encrypted traffic may be classified properly because the user terminal 10 provides a marking for the uplink packets and the PCEF network entity recognizes the marker. This classification would be impossible in the prior art when the uplink packets are encrypted.

In addition, as PCC rules for a PCC category may depend on the user and the requested service, the PCEF network entity 20 may refer to the marker for an identification of the requested service and further to the header of the uplink packet for an identification of the user. Here, the PCEF network entity 20 may use a correspondence table or the like between a marker identifying the application/service (ToS) and a corresponding PCC category (PCC category identifier). Then, an appropriate PCC rule according to the determined PCC category and thus determined user may be applied.

Alternatively, the uplink classification may be such that (ii) the uplink packets are classified into a PCC category according to a marker identifying the application/service and the service classification based on the PCC category identifier. As explained above, a marker "1" may e.g. be related to Skype used by a business customer, whereas marker "2" may e.g. be related to Skype used by a student customer. Here, the marker may thus identify both ToS and the PCC category identifier. Based on this marker, the PCEF network entity 20 may determine the association between the uplink packets and a service or application, even for encrypted packets, without having to perform DPI techniques. In addition the PCEF network entity 20 may apply different PCC rules corresponding to the two markers because the two customers/users are different or may still apply the same rule specific to Skype regardless of the users being different. An identification of the user by referring, for example, to the header of the uplink packets, may be avoided in this way.

Alternatively, the uplink classification may be such that (iii) the uplink packets are classified into a PCC category according to a marker that is identical to the PCC category identifier, such that a PCC rule according to a PCC category identifier may be directly applied in correspondence to the marker. This means that the entire service classification based on the PCC category identifier is already performed at the user terminal 10 and is directly represented by the marker. Consequently, the PCEF network entity 20 only has to apply a specific PCC rule directly corresponding to the marker.

In yet another alternative (iv) the uplink packet may be classified with respect to a specific PCC rule regardless of the application, e.g. further to above markers 1 and 2, marker 3 indicates internet browser traffic for business user and marker 4 means internet browser traffic for student user, the PCEF may decide to apply PCC rule A for business customer regardless of whether it is Skype or internet browser traffic.

The method then foresees a step S150 for storing, at said PCEF network entity 20, an association between information related to an uplink flow corresponding to said uplink packets and said uplink classification.

A flow is a set or sequence of packets from one service or application executing on a source computer to a corresponding service or application executing on a destination computer. According to one example, the information related to uplink flow is based on the quintuple: destination port, source port, destination IP address, source IP address, IP protocol which may be obtained from the header of the uplink packets. An association between information related to said uplink flow and said uplink classification based on a PCC category may, for example, be a correspondence table or the like between an information related to the uplink flow and the determined uplink classification. Such a stored association, the PCEF network entity 20 may be readily accessible and subsequently be used for a corresponding downlink classification.

The method then foresees a step S160 for receiving, at said PCEF network entity 20, downlink packets corresponding to said uplink packets. Here, the downlink packets correspond to uplink packets transmitted from the PCEF network entity towards a destination application/service server 40 in charge of handling the application/service.

Subsequently, the method foresees a step S170 for determining a downlink classification, at said PCEF network entity 20, for received downlink packets based on said stored association.

In particular, the PCEF network entity 20 may refer to the previously stored association between information related to said uplink flow and said uplink classification, and identifying the downlink flow as corresponding to the uplink flow provide a downlink classification that is related to the uplink classification.

Thanks to the present method, this cooperative and thus synergistic scheme between the user terminal 10 and the PCEF network entity 20 does no longer require a detailed analysis and classification of packets for upload and download traffic. Instead, based on the concept of transmitting an uplink traffic pre-classification (based on a marker related to ToS) or uplink traffic classification (based on a marker related to ToS and the PCC category identifier or the PCC category identifier alone), for subsequent and corresponding classification of downlink traffic, the PCEF entity performs the analysis and classification of the downlink traffic based on the analysis and classification of the uplink IP traffic received from the user terminal 10.

While the method has been illustrated with reference to both uplink and downlink classification, its implementation may be limited only to the uplink classification. In this alternative implementation, only steps S110 to S130 are performed omitting steps S140 to S170, which may therefore be optional according to an example.

According to an optional implementation, the method of the first embodiment may be applied in a case where the mobile PCC rules available at the user terminal 10 comprise at least one category identifier for classifying at least one amongst said at least one service and application, and wherein the step of determining the marker comprises determining the marker as the category identifier corresponding to said identification.

This optional implementation, which will be further described later in the description with respect to examples, thus refers to a situation wherein the PCC category attribute, i.e. the name or number of the PCC category in which the service has to be classified, is included in the mobile PCC rules available at the user terminal. Based on the available PCC category, the marker may be determined as the PCC category identifier corresponding to the identified service or application and the user.

According to this optional implementation, the marker is not only related to identifying a service or application, but may also depend on the PCC rules that should be applied for that service or application. Since the mobile PCC rules may depend on the users, the marking thus reflects the mobile PCC rules depending on the users. Thus, for two users, the same application (e.g. Skype) might be marked differently. As explained above, a marker "1" may e.g. be related to Skype used by a business customer, whereas marker "2" may e.g. be related to Skype used by a student customer.

Using, for example a grouping of markers, for example "1"-"10" for Skype, "11"-"20" for Internet browser, etc., or a correspondence table between the PCC category identifier, used as marking here, and a ToS value for identifying the type of traffic generated for the service or application associated to uplink packets, etc., the PCEF network entity 20 may still be able to classify uplink packets with respect to a service or application. As such, encrypted traffic may be classified properly because the user terminal 10 provides a marking for the uplink packets and the PCEF network entity recognizes the marker. This classification would be impossible in the prior art when the uplink packets are encrypted.

As a further optional implementation, the marker may be also depend on the operating system being employed at the user terminal. As such, it would be additionally be possible to recognize, at the PCEF network entity 20, to differentiate between applications that are running, e.g., in an Iphone, an Andriod, or in a Blackberry.

According to an optional implementation, the method of the first embodiment may further be applied in a case, wherein said at least one execution indication is determined when execution of at least one thread corresponding to said at least one amongst said service and application is detected.

As will be also further discussed later in the disclosed examples, the mobile PCC rules may further include a process and/or thread attribute including the name of processes/threads launched for the service or application to be identified. This may further depend on the operating system of the user terminal 10. Based on the thus indicated names of processes/threads, the user terminal 10 may monitor processes and threads launched for the user terminal 10. Further, when a process/thread listed in the mobile PCC rules is detected, the user terminal 10 may identify an execution indication specific for the service or application to be identified.

According to an optional implementation, the method of the first embodiment may further be applied in a case, wherein the mobile PCC rules comprise at least one category identifier, said at least one category identifier being in correspondence with PCC rules available at a PCEF network entity 20. This underlines the relationship between the mobile PCC rules and the PCEF PCC rules and further indicates that the user terminal 10 may determine a marker based on a category identifier that may be easily used by the PCEF network entity 20 to determine the uplink classification. As explained above, in the easiest case the marker is identical to the category identifier that would have been determined by the PCEF network entity 20 based on the PCC rules, such that the user terminal 10 is able to perform a pre-classification that may be simply used by the PCEF network entity 20.

According to an optional implementation, the method of the first embodiment may for the step S170 of determining a downlink classification further comprise matching information related to a downlink flow with said information related to said uplink flow, and determining said downlink classification as said uplink classification when a matching is detected.

According to this optional implementation, the information related to a downlink flow of downlink packets is based on the quintuple: destination port, source port, destination IP address, source IP address, IP protocol which also may be obtained from the header of the downlink packets. Notably, the downlink packets may have a quintuple in which, for example, the destination IP address and source IP address are reversed from the destination IP address and source IP address stored for the corresponding uplink packets. As such, a matching of information related to a downlink flow with information related to the uplink flow may be based on the comparison of respective destination IP addresses and source IP addresses. When a matching is detected, i.e. when stored information related to a corresponding uplink packet is found, the PCEF network entity 20 may determine the downlink classification simply by referring to the stored association to the uplink classification.

Thanks to this method, the downlink packets may be provided with a downlink classification that is simply derived from the uplink classification of the corresponding uplink packets. As such, also for the downlink classification no DPI techniques are required to determine a PCC category.

According to an optional implementation, the method of the first embodiment may further comprise a step S180 of applying, at the PCEF network entity 20, PCC rules for said uplink packets according to said uplink classification.

As explained above, the uplink classification, performed for the uplink packets based on the marker, may be based on the PCC category identifier. As such, PCC rules may be accordingly applied for this uplink traffic, before transmitting the uplink packets towards the server 40 in charge of handling the service or application.

According to another optional implementation, the method of the first embodiment may further comprise a step S180 of applying, at the PCEF network entity 20, PCC rules for said downlink packets according to said uplink classification.

As also explained above, the downlink classification, performed for the downlink packets based on the stored association between information related to the uplink flow and the uplink classification, and thus may be based on the PCC category identifier for the corresponding uplink packets. As such, PCC rules may be also accordingly applied for this downlink traffic, before transmitting the downlink packets towards the user terminal 10.

According to an optional implementation, the method of the first embodiment may further comprise a step of obtaining, at the user terminal 10, the mobile PCC rules from the PCEF network entity 20.

As will be further explained below, the mobile PCC rules are generated at the PCRF network entity 30 and may be user terminal specific as well as user specific. The mobile PCC rules may comprise the conventional PCC rules known described within 3GPP TS 23.203 or may be implemented as an extension of the same.

A method according to a second embodiment of the present invention will now be described with reference to FIG. 4. The method of the second embodiment, which may also be combined with the method of the first embodiment, is for detecting tethered uplink packets. As explained above, tethering occurs, when the user terminal, e.g. a mobile phone, is used as a modem. From an analysis perspective, it is very hard with DPI techniques to determine when users/subscribers are using tethering.

According to the second embodiment, the method comprises a step S210 for determining, at said user terminal 10, a tethering indicating marker for uplink packets not being associated with one amongst a service and an application being executed on said user terminal.

When, in other words, the user terminal 10 is used as a modem, then uplink packets may be transmitted from the user terminal 10 that are not associated to an application or a service being executed at the user terminal 10. Instead, the uplink packets are actually associated to applications or services being executed on a third device, for example a PC, that uses the user terminal 10 as a modem. Therefore, all such tethered uplink packets may enter the user terminal 10 from a WiFi interface or any other ingress interface and leave the user terminal 10 to the mobile communication network (e.g. a radio network). As such tethered uplink packets are not related to an application or a service being executed at the user terminal 10, the user terminal 10 is instead adapted to uplink detect coming from an ingress interface and leaving to a radio interface.

Alternatively or supplementary, as tethered uplink packets have a different TTL compared to uplink packets associated to an application/service executed on the user terminal 10, the user terminal 10 may base the detection of tethered uplink packets also on a determination of TTL.

Thanks to the above detection of tethered uplink packets based on ingress/egress traffic and/or TTL, the user terminal may determine an appropriate marker for such tethered uplink packets.

According to an example, which will be elaborated further later in the disclosure, the mobile PCC rules available at the user terminal 10 may include a ToS value for tethered uplink packets that are not related to a process/thread at the user terminal 10. Based on this ToS value, the user terminal 10 may thus determine a tethering indicating marker.

According to the second embodiment, the method further comprises a step S220 for transmitting, at said user terminal 10, said tethering indicating marker and said uplink packets not being associated with one amongst a service and an application being executed on said user terminal, to said PCEF network entity 20.

As explained above, the marker may be inside the packet or may be sent separately from the packet. For example, the tethered uplink packets may be marked with a tethering indicating watermark, for example based on the ToS value indicated in the mobile PCC rules, before transmitting the uplink packets to the PCEF network entity 20.

Upon receiving the thus marked uplink packets, the PCEF network entity 20 may identify tethering from the tethering indicating marker, and without having to perform any kind of detailed packet inspection. In addition, the PCEF network entity 20 may determine an appropriate uplink classification and thus apply a particular PCC rule for the tethered uplink packets. For example, the PCEF network entity 20 may decide to not transmit the tethered uplink packets.

Figure 4:
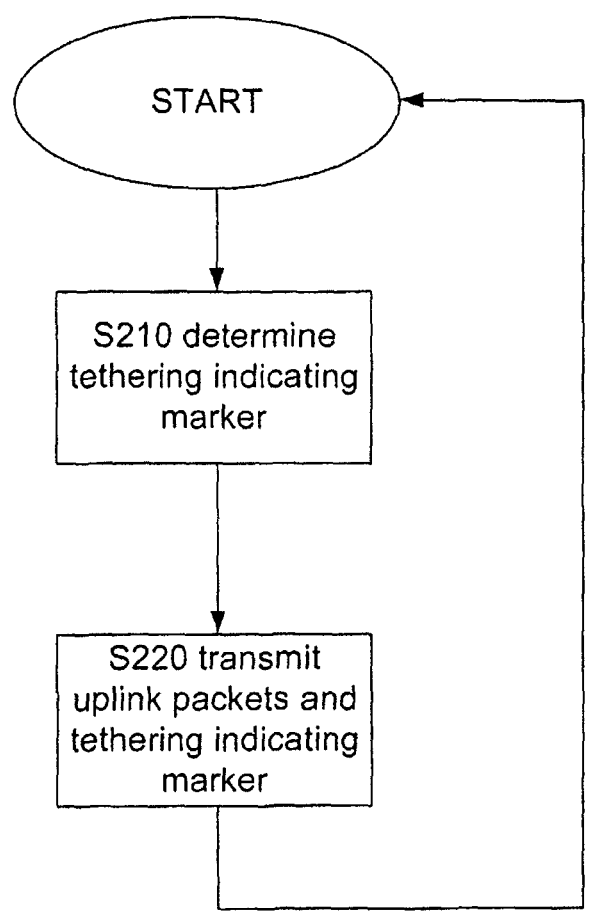
FIG. 4 illustrates a flow chart of a method according to a second embodiment of the present invention.

The method of FIG. 4 can be performed independently from the other embodiments or in combination with any of them. According to one example, steps S210 and S220 may represent, correspondingly, specific instances of steps S120 and S220 or may replace the same.

Figure 5:
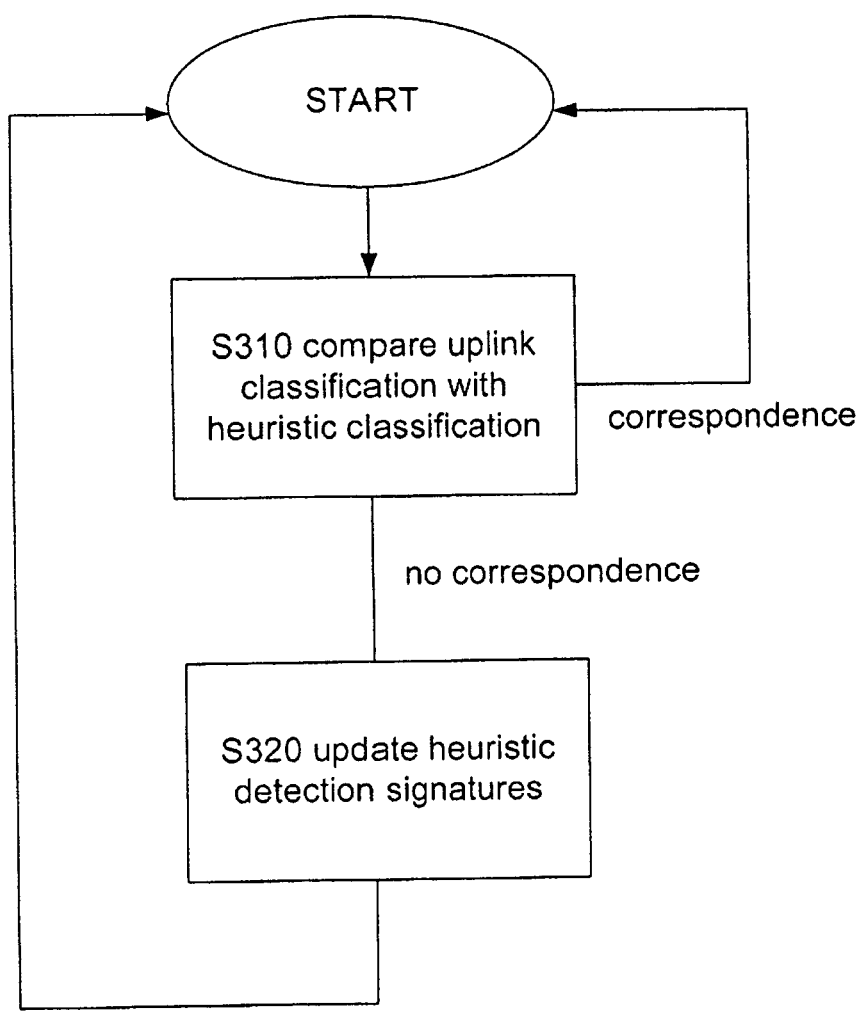
FIG. 5 illustrates a flow chart of a method according to a third embodiment of the present invention.

A method according to a third embodiment of the present invention will now be described with reference to FIG. 5. The method of the third embodiment, which may also be combined with the method of the first and second embodiment, is for improving heuristic detection at the PCEF network entity 20.

According to the third embodiment, the method comprises a step S310 for comparing, at said PCEF network entity 20, an uplink classification with a heuristic classification obtained by directly classifying uplink packets with heuristic detection signatures.

As explained above with respect to step S170 shown in FIG. 3, the uplink classification is determined based on the marker transmitted with the uplink packets.

In addition, the uplink packets may be also directly classified based on heuristic signatures which may be based on deep packet inspection, which extracts and analyzes the content in both packet header and payload over a series of packet transactions by identifying, classifying and grouping applications and protocols into such heuristic signatures related to the behavioral analysis of the user traffic. The heuristic signatures may thus be based on a set of empirical patterns characteristic of a particular protocol or application. Based on the heuristic signatures, the PCEF network entity 20 may thus determine a direct classification of the uplink packets, and thus determine at least one of the application or service (based, e.g., on ToS) and the service classification (based, e.g., on the PCC category identifier).

When comparing the uplink classification with the direct classification, the user PCEF network entity 20 may thus be able to determine, whether the heuristic signatures are appropriate in order to classify uplink packets, which, for example, may be received from user terminals without the marking capabilities.

According to the third embodiment, the method further comprises a step S320 for updating, at said PCEF network entity 20, heuristic detection signatures, if the comparing determines that said uplink classification and said heuristic classification do not correspond.

In other words, when the uplink classification and the heuristic classification do not correspond, for example, when the uplink classification indicates a different application or service than the heuristic classification, and/or when the uplink classification indicates a different PCC category identifier than the heuristic classification, then the heuristic detection signatures may be appropriately updated to indicate the same classification results as the uplink classification.

According to an optional implementation, the method of the third embodiment may further comprise the step of receiving, at said PCEF network entity 20 a notification from a user terminal, wherein the notification indicates that said user terminal provides a marker that may be used for the above comparing step S310. This notification may thus indicate that this user terminal is trustful and can be selected for a better tuning of heuristic signatures.

A user terminal and a corresponding method according to a fourth embodiment of the present invention will now be described with reference to FIG. 6. The user terminal of the fourth embodiment is for classifying packets, in particular uplink, packets, associated to at least one amongst a service and an application.

The user terminal 10 according to the fourth embodiment may be a mobile station, a non-mobile computing device or any user device capable of being connected to a data or communication network and exchange data packets therewith. Such a user terminal 10 may be, for example, a smartphone, a tablet and the like, and may execute applications and/or use services while being constantly connected to a mobile communication network.

Figure 6:
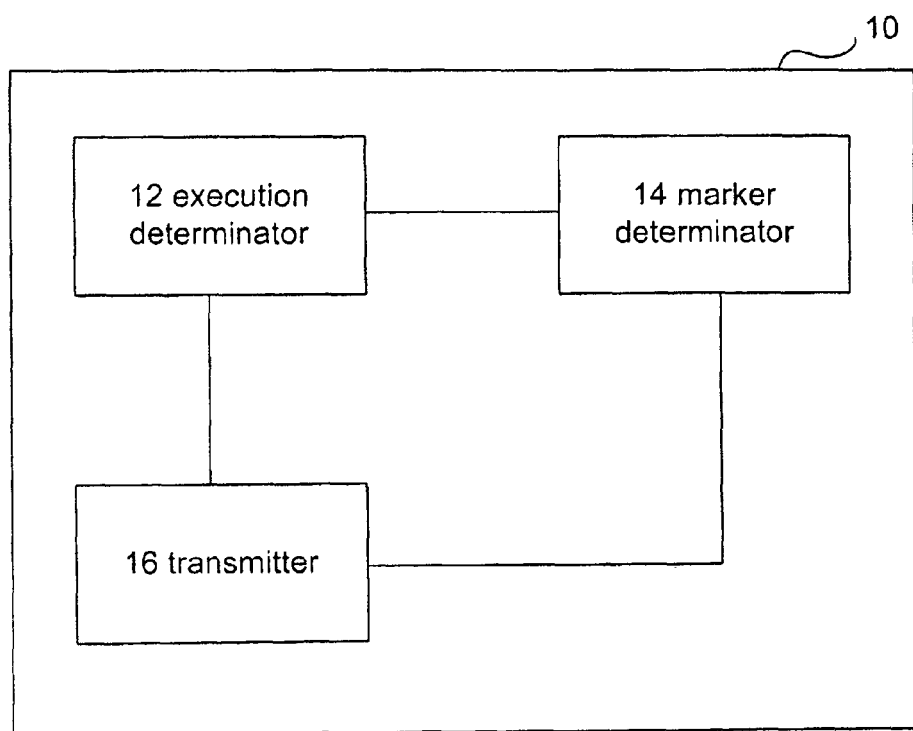
FIG. 6 illustrates a user terminal according to a fourth embodiment of the present invention.

As shown in FIG. 6, the user terminal 10 according to the fourth embodiment comprises an execution determinator 12, a marker determinator 14, and a transmitter 16.

The execution determinator 12 is adapted to determine at least one execution indication indicating said at least one amongst said service and application being executed on said user terminal and generating uplink packets, as explained above with respect to step S110 of the first embodiment.

The execution determinator 12 or execution determination means 12 refers to software and/or hardware implemented at the user terminal for performing the above stated functionality. For example, the user terminal 10 may install a Policy Control Enforcement Mobile Function (PCEMF) module at the user terminal 10, wherein the PCEMF module (also referred to as "PCEMF" in the remainder of the disclosure) is a software interacting with the CPU (or a hardware component integrated with the CPU or interacting with the same CPU or with another SW module) of the user terminal 10 to perform the functionality of the execution determinator 12.

Further, the marker determinator 14 is adapted to determine a marker on the basis of mobile PCC rules available at said user terminal and said at least one execution indication, said marker for identifying at least one amongst a service and an application associated to said uplink packets, as explained above with respect to step S120 of the first embodiment.

Here, the PCEMF module interacts with the CPU of the user terminal 10 to perform the functionality of the marker determinator 14.

Furthermore, the transmitter 16 of the user terminal 10 is adapted to transmit said marker and said uplink packets, to said PCEF network entity 20, as explained above with respect to step S130 of the first embodiment.

In addition, the user terminal 10 may be also adapted to perform any steps performed at the user terminal with reference to the first embodiment and its variations and/or the method according to the second embodiment of the present invention.

A PCEF network entity and a corresponding method according to a fifth embodiment of the present invention will now be described with reference to FIG. 7. The PCEF network entity according to the fifth embodiment is adapted to perform policy and charging enforcement functions, to communicate with the user terminal 10 according to the fourth embodiment.

Figure 7:
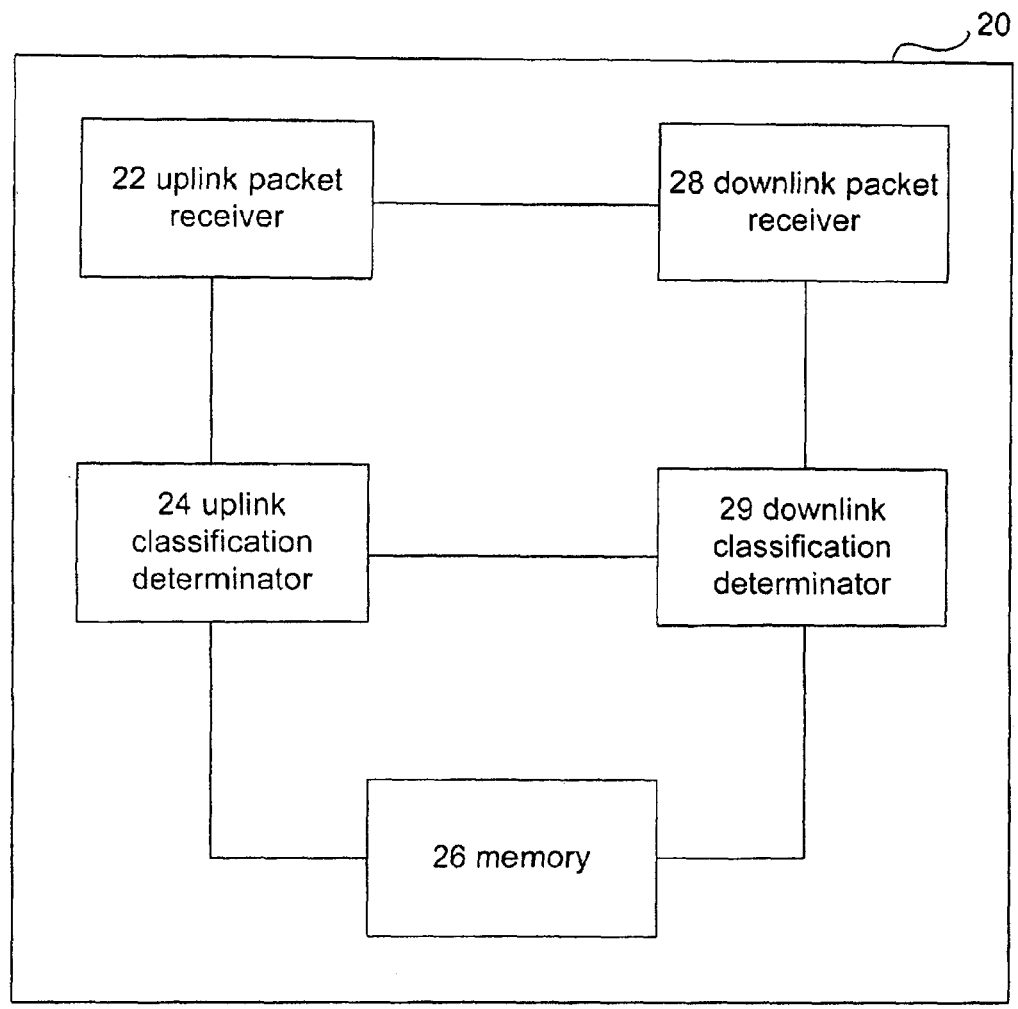
FIG. 7 illustrates a PCEF network entity and according to a fifth embodiment of the present invention.

As shown in FIG. 7, PCEF network entity 20 according to the fifth embodiment comprises uplink receiver 22, an uplink classification determinator 24, a memory 26, a downlink receiver 28, and a downlink determinator 29. The downlink receiver 28 and the downlink determinator 29 may be optional according to one variant of the present embodiment, in case for instance only uplink packets want to be handled and classified.

Here, the respective receivers and determinators of the PCEF network entity 20 refers to software and/or hardware implemented at the PCEF network entity 20 for performing the below stated functionality. Here, the uplink receiver 22 and downlink receiver 28 may be combined in one single entity implemented in hardware, software or a combination thereof. Likewise, also the uplink classification determinator 24 and the downlink receiver 28 may be combined in one single entity implemented in hardware, software or a combination thereof. The memory 26 may be any kind of data storage device for recording (storing) information (data). Other combinations are foreseeable without departing from the scope of the invention.

The uplink receiver 22 shown in FIG. 7 is adapted to receive, from said user terminal entity (10) according to the previous embodiments, uplink packets and a marker. The marker is for identifying at least one amongst a service and an application associated to said uplink packets, and is further dependent on mobile PCC rules available at said user terminal entity (10). In addition, the marker also depends and on at least one amongst said service and application being executed on said user terminal 10.

The uplink classification determinator 24 shown in FIG. 7 is adapted to determine an uplink classification for received uplink packets based on said marker, as explained with respect to step S140 of the first embodiment.

The memory 26 shown in FIG. 7 is adapted to store an association between information related to an uplink flow corresponding to said uplink packets and said uplink classification, as explained with respect to step S150 of the first embodiment.

The downlink receiver 28 shown in FIG. 7 is adapted to receive downlink packets corresponding to said uplink packets, as explained with respect to step S160 of the first embodiment.

Furthermore, the downlink determinator 29 shown in FIG. 7 is adapted to determine a downlink classification, at said PCEF network entity, for received downlink packets based on said stored association, as explained with respect to step S170 of the first embodiment.

According to an optional implementation, the PCEF network entity 20 may also be adapted to provide a marker for the downlink packets. In the optional implementation, the PCEF network may be adapted to refer to the stored association between information related to an uplink flow corresponding to said uplink packets and said uplink classification, and use the information related to the uplink classification for determining a marker for the downlink packets. Then, the marker for the downlink packets is based on the marker for the uplink packets and may thus provide the user terminal 10 with an early indication of the association between the downlink packets and the corresponding application or service at the user terminal 10.

In addition, the PCEF network entity 20 may be also adapted to perform any steps performed at the PCEF network entity with reference to the first embodiment and its variations and/or the method according to the third embodiment of the present invention.

A PCEF network entity and a corresponding method according to an alternative fifth embodiment of the present invention will now be described (not illustrated). The PCEF network entity according to the alternative fifth embodiment is adapted to perform policy and charging enforcement functions, and to communicate with the user terminal 10 according to the fourth embodiment.

The PCEF network entity 20 according to the alternative fifth embodiment comprises uplink receiver 22 and an uplink classification determinator 24, and a unit 23 for applying a PCC rule corresponding to said uplink classification.

The uplink receiver 22 according to the alternative fifth embodiment is adapted to receive, from said user terminal entity 10 according to the previous embodiments, uplink packets and a marker. The marker is for identifying at least one amongst a service and an application associated to said uplink packets, and is further dependent on mobile PCC rules available at said user terminal entity 10. In addition, the marker also depends and on at least one amongst said service and application being executed on said user terminal 10.

The uplink classification determinator 24 according to the alternative fifth embodiment is adapted to determine an uplink classification for received uplink packets based on said marker, as explained with respect to step S140 of the first embodiment. Accordingly, the PCEF network entity 20 may be relieved from detailed packet inspections or the like to identify an association between the uplink packets and the corresponding applications or services. Thanks to this identification, a more reliable uplink classification may be achieved using much less resources.

The unit 23 according to the alternative fifth embodiment is adapted to apply a PCC rule corresponding to the determined uplink classification. In particular, the uplink classification may be a particular PCC category identifier, for which the PCC rules available at the PCEF network entity 20 are applied.

According to an optional implementation of the alternative fifth embodiment, the PCEF network entity 20 may further comprise a memory 26, a downlink receiver 28, and a downlink determinator 29.

The memory 26, as explained above, is adapted to store an association between information related to an uplink flow corresponding to said uplink packets and said uplink classification, as explained with respect to step S150 of the first embodiment.

The downlink receiver 28, as explained above, is adapted to receive downlink packets corresponding to said uplink packets, as explained with respect to step S160 of the first embodiment.

Furthermore, the downlink determinator 29, as explained above, is adapted to determine a downlink classification, at said PCEF network entity, for received downlink packets based on said stored association, as explained with respect to step S170 of the first embodiment.

Figure 8:
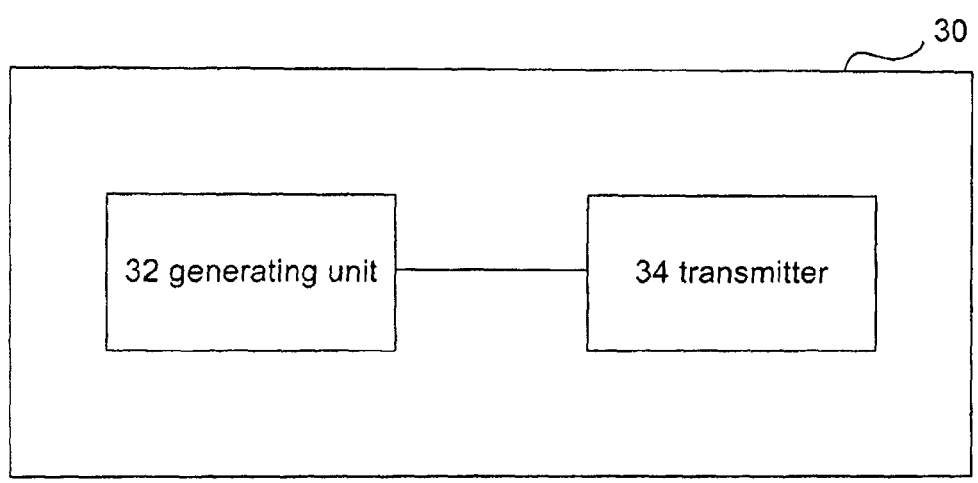
FIG. 8 illustrates a PCRF network entity according to a sixth embodiment of the present invention.

A PCRF network entity 30 according to a sixth embodiment of the present invention will now be described with reference to FIG. 8. The PCRF network entity according to the sixth embodiment is adapted to perform policy and charging rules function, and to communicate with the PCEF network entity 20 and the user terminal 10 according to the above embodiments.

According to the sixth embodiment, the PCRF network entity 30 comprises a generating unit 32 and a transmitter 34.

The generating unit 32 is for generating PCC rules to be used at a PCEF network entity 20 and mobile PCC rules to be used at a user terminal 10. Here, the mobile PCC rules comprising mobile PCC rules and guidelines are for allowing a user terminal to determine whether at least one amongst a service and an application is executed on said user terminal entity, as explained with respect to step S110 of the first embodiment. In addition, the mobile PCC rules and guidelines are for allowing a user terminal to determine a marker for identifying said at least one amongst a service and an application associated to uplink packets, as explained with respect to step S120 of the first embodiment.

In addition, the mobile PCC rules and guidelines generated and stored in the in the PCRF network entity 30 may be specific to an operating system of the user terminal and allow the user terminal to associate threads to a specific application, such that the user terminal can correctly mark the uplink packets.

The mobile PCC rules (also referred to as GPCC in the later disclosed examples), to be installed at the user terminal may include at least one of:
  a service identifier for identifying a service/application;
  one or more thread/process identifiers for detecting the service/application when running in the user terminal;
  a PCC category identifier for classifying a service;
  a watermark to be included for the traffic originating for the service/application; and
  indications of actions to be performed by the user terminal The mobile PCC rules, generated at the PCRF network entity 30, may thus be specific to the user terminal 10 (e.g. depending on the operating system), and may be specific to the user of the user terminal 10 (via the PCC category identifier, e.g. a "gold" user, a "silver" user, or the like). The mobile PCC rules are thus different from the PCC rules available at the PCEF network entity 20.

Further, the transmitter 34 is adapted to transmit said PCC rules and said mobile PCC rules to the PCEF network entity 20.

The PCRF network entity 30 may thus respond to a request from the PCEF network entity 20 to provide PCC rules to be installed at the PCEF network entity 20 and a request from the PCEF network entity 20 to provide mobile PCC rules to be installed at the user terminal 10.

In addition, the PCRF entity 30 may be also adapted to perform any steps or functions in relations to the user-terminal or PCEF entity as described in the present specification.

Further illustrative examples will now be provided explaining in further details how the invention works.

EXAMPLE 1

To overcome the above mentioned problems of the prior art, or at least to mitigate them, the present invention provides for installing a Policy Control Enforcement Mobile Function (PCEMF) module in each user terminal or user equipment (UE), wherein the PCEMF module is in charge of identifying end-user services and marking them in accordance with mobile PCC rules (also referred to as global PCC (GPCC) rules) downloaded from the PCRF. This PCEMF module cooperates with a PCEF device and a PCRF server in order to carry out an enhanced method of classifying traffic packets by the PCC architecture.

Accordingly, a mechanism is provided to guarantee the full identification of services and applications from a mobile device through a mobile network with no detection failure. This also allow charging this traffic and also applying PCC functions in a safe and precise way specially for proprietary applications or protocols that only can be identify based on heuristic analysis.

This method is based on installing a software program in the mobile user terminals that acts as an extension of PCEF capability on the mobile device (PCEMF). The main function of PCEMF is identifying end user services or applications and marking them according to some mobile PCC rules (also abbreviated as MPCC) initially downloaded from PCRF. Then, these marked packets would be identified easily for a PCEF network entity that would have also access to those configuration rules. The PCEF network entity, instead of performing heuristic analysis, would only have to check a predetermined footprint in the packet with a less consuming CPU analysis called shallow inspection, i.e. an inspection based on some specific attributes in IP protocol. The downlink packets will be identified as packets that belong to the same flow as the marked uplink packets. This would guarantee a perfect and simple PCEF detection. The PCEF network entity may therefore be able to identify with higher accuracy any user mobile application or service at 100% success and would only have to apply a shallow inspection that is efficient and quick. This would help to alleviate a large bottleneck in the PCEF network entity and therefore increase capacity. According to the mechanism of the present invention, the complexity of the analysis of packets is being performed by several nodes, i.e. user terminals, so that it may be decentralized.

Figure 9:
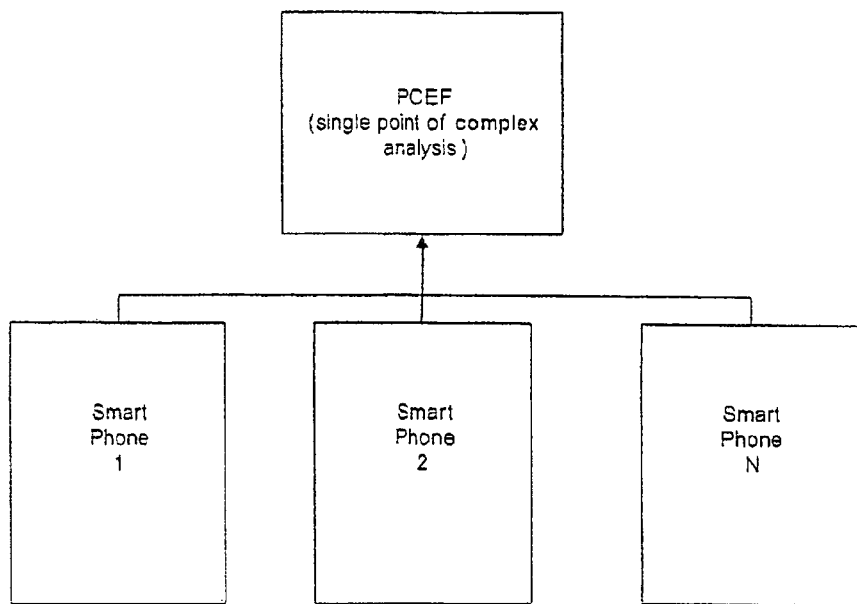
FIG. 9 illustrates a first example according to the present invention.
Figure 9:
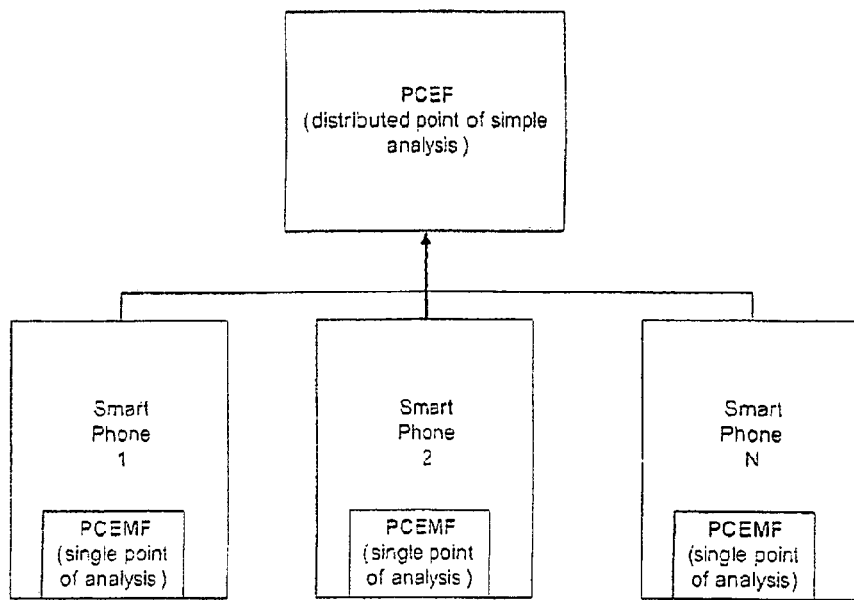

FIG. 9 illustrates, in comparison with a configuration according to the state of the art, an exemplary configuration of decentralized packet analysis, wherein the PCEF network entity, which is a single point of packet analysis in the state of the art, distributes the complex packet analysis process to the user terminal equipped with mobile PCEF capabilities (PCEMF). The PCEF network entity, by trusting the complex packet analysis process performed by the user terminal equipped with mobile PCEF capabilities (PCEMF), has to perform only a simple packet analysis based on the marker and the flow parameters of the packet received from the PCEMF.

At the same time, a mechanism is provided for updating heuristic signatures for those users that cannot have a PCEMF installed in their user terminals so that other users benefit of the detection improvement. This method consists of comparing results of detection between some specific test users or group of test users of PCEMF with heuristic detection for those services in PCEF. Accordingly, these are the steps performed according to this example (noting that test user terminal refers to a user terminal as previously introduced):

1. Test user terminal with PCEMF generates traffic.
2. User Traffic is marked according to MPCC rules in user terminal.
3. The PCEF network entity performs the following actions:
   a) Analysis of the traffic with its heuristics.
   b) Analysis of marked traffic from test user.
   c) Comparing results from steps a) and b).
   d) If the results from steps a) and b) are equal, the PCEF network entity does not do anything.
   e. If both results from steps a) and b) are not equal, the PCEF network entity updates its signatures accordingly.
4. Optionally, the PCEMF could also be used as a communication way with a service operator to notify relevant information.

The concept of the present invention may involve at least the user terminal and the PCEF network entity, but may also involve the PCRF network entity, and even the Subscriber Profile Repository (SPR).

Here, the user terminal is related to a subscriber user, i.e. the end user communication originator. The PCEMF module at the user terminal provides an extension of PCEF capabilities. It may be a software application running in the user terminal and may provide at least one of the following functions:

Analyzing services and applications: PCEMF identifies services of end users. PCEMF recognizes at least one of processes and threads, being execution indications of services and applications running on the user terminal. The PCEMF may further identify the parent process of an application (e.g. Skype) and all child threads forked from that parent process. Then, the PCEMF can identify all egress/ingress packets from the processes associated to that application, i.e. parent and child processes.

Marking packets: PCEMF marks the packets belonged to a specific client application according to a configuration file (as will be later explained with respect to GPCC) PCEMF can mark all the egress/ingress traffic from specific applications (skype, Windows Live Messaging, games as War of Craft, whatsup) or only can mark packets from specific services (VoIP, instant messaging, online games) or protocols (HTTP, TCP, MMS).

Network statistics: PCEMF may offer client application statistics as to bandwidth, packets, bytes uplink and downlink.

Network intelligence: the service operator may further use the PCEMF as a way of communication with the user terminal and may thus be able to offer network intelligence services.

Control Policies actions: the PCEMF can block, limit or drop in user terminal devices some specific client applications according to a configuration file (as will be later explained with respect to GPCC).

The PCEMF may thus be considered as a PCEF capability extension that runs in the own mobile terminal device. PCEMF may be a software program that can be developed in a programming language and run independently from operating system (e.g. java language) and/or can have different versions on every popular mobile operating system (IOS, Android, Blackberry OS, Windows Mobile OS). This PCEMF capability could be installed manually for the user from a mobile application store (Apple Store, Android Market) or automatically (as will be explained later), for example as an element for those users that have downloaded its operating system as part of cloud applications. This PCEMF has to be installed in a hardware device and depends on the running operating system. In addition, the PCEMF may need to have access to the operating system in order to provide a marker for the user packets.

In addition, the PCEMF may also contain an interface logic that allows customizing the mobile PCC rules. This interface logic may be saved in the previously mentioned GPCC rules.

As already indicated above, the main function of PCEMF is to identify service mobile application, to determine a marker based on the GPCC rules and the identified application/service, based on which a digital footprint (identifier) may be included in every packet belonging to a specific mobile application. Alternatively the marker may be send separately from the packet.

In particular, PCEMF will detect the ingress/egress traffic from a process belonging to an application or service and will mark the packets by a footprint. PCEMF may, for example, use the application name registered in the operating system installation records to identify the running process and to mark packets belonged to that process. This footprint may be related to adding a specific value, for example in ToS (Type of Service) field or DSCP (Differentiated Services Code Point) field in IP header or as part of an extension in IPv6. For security reasons PCEMF may also mark the packets in a specific pattern (e.g. twice) to avoid the risk that another network element changes it unintentionally. Finally as we will see later, the big innovative advantage of this inventive concept is precisely that the PCEF network entity can apply easily PCC policies over the packets that are been marked for the PCEMF (e.g. increase bandwidth for those application) and consequently the PCEF network entity could also apply restrictive policies for packets not marked to avoid possible frauds and to recognize applications that are been correctly marked. For example packets not marked could suffer bandwidth restrictions or be dropped. The GPCC rules describe the software processes or threads that are launched from a mobile application or services and so should be tracked (for example by marking packets) and also the footprint to be added (e.g. ToS field value). Further, there may be different GPCC rules depending on the mobile operating system (IOS, Android, Nokia Mobile, Windows, Linux . . . ). In any case, PCEMF should not alter nor modify the user traffic protocols and must run transparently to the end user.

The PCEMF may be further used as a communication way with service operator to provide notification about vouchers, offers, discounts or installation about other applications or services. PCEMF could contain some logic to show these notifications and to apply actions based on them.

Further, the Policy and Charging Enforcement Function (PCEF) network entity is responsible for enforcing policies with respect to authentication of subscribers, authorization to access and services, and accounting and mobility.

In addition, the Policy and Charging Rules Function (PCRF) network entity houses the individual policies defining network, application, and subscriber conditions that must be met in order to successfully deliver a service or maintain the QoS of a given service.

The Subscriber Profile Repository (SPR) is a logical network entity that may be a standalone database or integrated into an existing subscriber database such as a Home Subscriber Server (HSS). It includes information such as entitlements, rate plans, etc. The SPR may provide at least one of the following subscription profile information (per PDN, which is identified by the PDN identifier): Subscriber's allowed services; for each allowed service, a pre-emption priority; Information on subscriber's allowed QoS, including the Subscribed Guaranteed Bandwidth QoS; Subscriber's charging related information (e.g. location information relevant for charging); and subscriber category.

In addition, the SPR may also contain a Global Policy and Charging Control Repository (GPCCR). This repository keeps saved different sets of GPCC (Global Policy and Charging Control) rules. GPCC rules can be considered in an example as an extension of PCC rules. GPCC rules contain the PCC rules and also instructions about how to identify the processes or threads belonging to an application or service depending on the mobile operating system. These GPCC rules can be customized from a service operator for every user or user profile in any moment. The operator would only need to change these GPCC rules in the GPCCR. Once the user connects to the mobile Packet Core, the new GPCC rules are installed in the PCEMF depending on the mobile operating system (which will be further elaborated below).

EXAMPLE 2

The following example show detailed message flows according to the invention.

Figure 10:
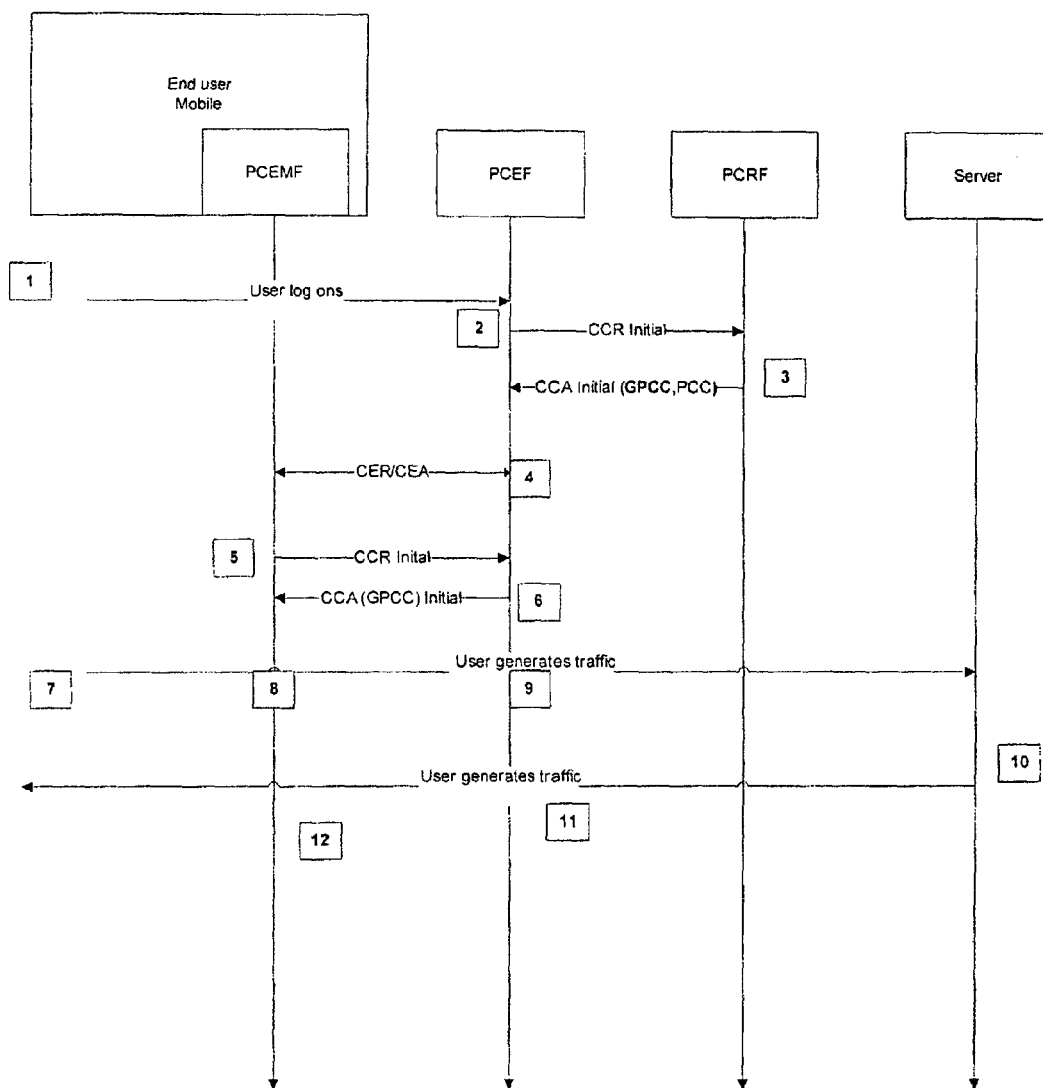
FIG. 10 illustrates a second example according to the present invention.

FIG. 10 shows an example for a message flow between the mobile end user (i.e. the user terminal) equipped with the PCEMF module, the PCEF network entity, the PCRF network entity, and a server. The diameter protocol may be used for the communication between PCEF and PCRF as well as between the user terminal and PCRF.

Prior to the steps shown in FIG. 10, the user may install the PCEMF application in the mobile user device, for example by downloading the application from a software market (proprietary operator's market or a generic market). Alternatively, the PCEMF application may be already installed (the mobile user device belonged to a service operator). However this PCEMF does not have any CCR previously loaded. In addition, PCEMF should be transparent to PCRF. In fact and according to the example, from the PCRF point of view, the PCEF and the PCEMF are the same functional node in the sense that they both enforce policies.

In a first step, the user of the user terminal logs on into the core packet network. When the user connects to the network, a first IP-CAN session is established at a PCEF with DPI capabilities (PCEF-DPI) or an existing IP-CAN session is modified. This IP-CAN session may have a user parameter, for example a RADIUS parameter, or as a new attribute of User Agent Profile, indicating that the mobile user terminal has PCEMF capabilities. This may also indicates that, the user terminal has the PCEMF capability already installed in the user terminal and/or what operating system is running in the user terminal.

In a second step, PCEF sends an initial Credit-Control-Request (CCR) message to the PCRF with the Request-Type AVP set to INITIAL_REQUEST. A capability negotiation in Gx interface takes place with the PCRF to determine the proprietary features to be applied. Here, a new parameter may be included indicating that the PCEF also requests the GPCC rules corresponding to this user and to the user specific mobile operating system.

In a third step, the PCRF returns a Credit-Control-Answer (CCA) message to the PCEF including PCC rules and GPCC rules. In particular, depending on the negotiated capabilities, the CCA message includes some form of policy control decision, which determines the user access rights to the different services. This CCA-message will thus contain the GPCC rules that the PCEMF will apply locally at the mobile user terminal.

The GPCC rules may be composed of at least one of the following fields:
Service: name of the service or application that has to be measured/identified/monitored by PCEMF
Processes/Threads: name of processes/threads launched for the service or application mentioned before. These names are the key to identify the service or application running in the mobile operating system of the user terminal. This field has to match with the process running in the mobile operating system. For example if this GPCC field is called "skype.exe" everytime that a user launches an application called "skype.exe" (this is the name included in the operating system installation records and also the name of the process running now), the PCEMF will match the GPCC field "skype.exe" with the name of process running in mobile operating system. So PCEMF will start marking the packets from this process associated to that GPCC.
PCC category: name or number of the PCC category in which service or application has to be classified
Type of Service (ToS): digital footprint that has to be included in traffic generated for this service
Action: Possible actions that can be performed by PCEM, for example drop, limit bandwidth, parental control.

Furthermore, the PCEF stores the received GPCC rules and PCCs. These GPCC attributes are the same as those that the PCEMF also received with the exception of PCC category that is an optional attribute for the PCEMF.

In a fourth step, PCEMF will open a Diameter session against PCEF (Diameter CER/CEA). In particular, if the user terminal has PCEMF capability available, then PCEF and PCEMF will initiate a dialogue. Here, PCEMF will act as a client to retrieve the GPCC rules stored at PCEF, as initially PCEF did in the same way with PCRF, so that PCEF resumes the role as a policy server. While these GPCC rules are being downloaded from PCEMF, optionally PCEF applies PCC policies (retrieved from PCRF or local PCC policies) as any other user traffic that does not have the PCEMF capability: Dialogue between PCEF and PCEMF could be based on Diameter but any other protocol language could be chosen.

More specifically, PCEMF will, in a fifth step, open a Diameter session against PCEF in which the PCEMF sends a CCR Initial Request towards PCEF requesting the GPCC rules. The PCEF will answer, in a sixth step, with a CCA message with the corresponding error code (2001 if operation is successful and any other error code in the opposite case). Here, PCEF will send the following fields in the GPCC:
Service: name of the service or application that has to be measured/identified/monitored by PCEMF
Processes/Threads: name of processes/threads launched for the service or application mentioned before. These names are the key to identify the application running in the mobile operating system.
ToS: digital footprint that has to be included in traffic generated for this service Action: Possible actions that can be performed by PCEM, such as Drop, Limit bandwidth, or Parental control Optionally it may also contain PCC category.

Importantly, in this step, we assume a Diameter dialogue between PCEMF and PCEF to retrieve the GPCC rules for didactic reasons in order to simplify and clarify the architecture and the procedure. However we could consider any other more efficient way of communication and protocol. Even other solutions not housed in PCEF may be considered. Thus PCEMF could retrieve the GPCC rules from another network entity node that could receive continuous updates with user GPCC rules from different PCEFs or PCRFs.

In a seventh step, the user terminal may start generating uplink traffic, i.e. uplink packets, for a specific service or application.

In an eight step, PCEMF may monitor all processes/threads determined by service and process attributes in GPCC. The PCEMF will accordingly identify this specific service or application and provide a marking/footprint for the uplink packets. Such a marking may be in accordance with the value defined in ToS attribute in GPCC.

In a ninth step, PCEF may detect this marker/footprint associated with uplink packets and apply a corresponding PCC rule to that application or service. According to the GPCC rules, this uplink traffic may be classified in a PCC category, either at the user terminal or the PCEF. If user traffic packets are not marked with the footprint or come with an value that are not being defined previously in GPCC rules, PCEF will apply the PCC rules as any other user traffic that does not have the PCEMF capability. PCEF gets information of this uplink packet and stores it internally. The most useful information of this uplink packet is the flow to which this packet belongs. It is composed of the following attributes: Destination Port, Source Port, Destination IP address, Source IP address, and IP Protocol.

In a tenth step, a server will answer a request of the user terminal and accordingly generate downlink traffic, i.e. downlink packets.

In an eleventh step, this downlink traffic is classified in PCEF according to the information stored in the ninth step, i.e. the same quintuple or flow: protocol, IP source, IP destination, source port and destination port. Therefore PCEF may classify this downlink traffic in the same PCC category as the corresponding uplink packet/traffic.

In a twelfth step, PCEMF may classify downlink traffic according to the traffic received by this process as identified in the eight step.

On the other hand PCEMF may also apply some actions extracted from the GPCC retrieved from PCEF. Those actions could increase or decrease the bandwidth or even drop the traffic if it would be necessary. This would be usually applied to improve the quality of service in case of network congestion. PCEMF and PCEF can consolidate which are the results that have obtained for each service.

PCEMF may further report to PCEF with another footprint when tethering is detected. Tethering, is detected when end user is using a mobile as a modem, for example when a Personal Computer is connected to Internet with the user terminal, for example a mobile phone.

PCEF may further initiate a dialog to send new GPCC rules at any moment and therefore PCEMF may obtain new GPCC rules at any moment that the service mobile operator would need.

EXAMPLE 3

The following shows other examples of detailed message flows according to the invention.

Figure 11:
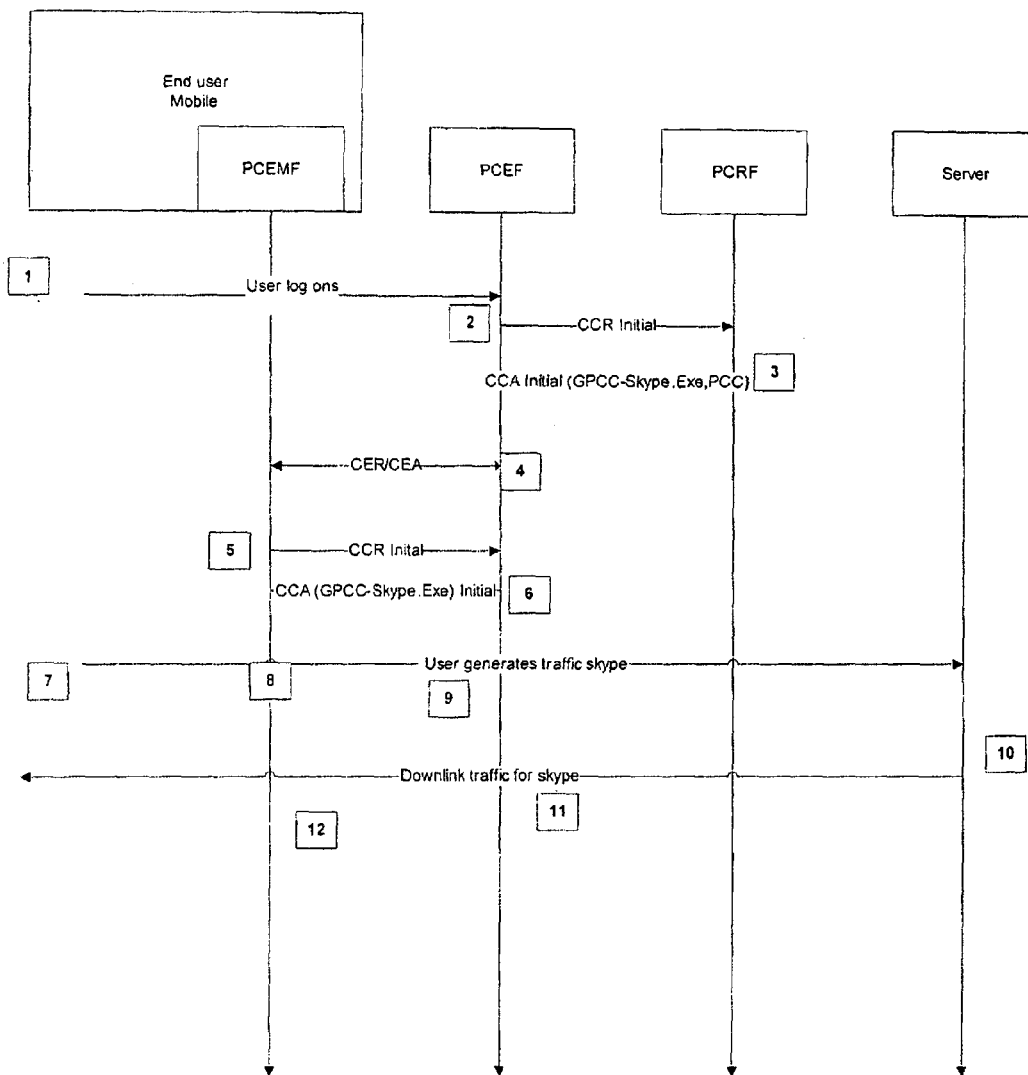
FIG. 11 illustrates a third example according to the present invention.

In particular, FIG. 11 shows an example of how PCEMF and PCEF interacts and how a service or application, like for example skype, should be classified.

In a first step according to FIG. 11, the user terminal logons into the core packet network and indicating that the user terminal has a PCEMF installed with Windows Mobile operating system.

In a second step according to FIG. 11, PCEF sends an initial Credit-Control-Request (CCR) message to the PCRF with the Request-Type AVP set to INITIAL_REQUEST.

In a third step according to FIG. 11, the PCRF returns a Credit-Control-Answer (CCA) message to the PCEF including PCC and GPCC rules. For this example, GPCC rules are composed of the following fields:

Service: Skype,
Processes/Threads: Skype.exe.
PCC category: 5
ToS: 8
Action: Limit Bandwidth 128

Accordingly, PCEF stores the received PCC and GPCC rules.

In a fourth step according to FIG. 11, PCEMF will open a Diameter session against PCEF (Diameter CER/CEA). In a fifth step, PCEMF will open a Diameter session against PCEF, and PCEMF sends a CCR Initial Request towards PCEF requesting the GPCC rules. In a sixth step, PCEF answers with a successful CCA message (with a 2001 result code) and PCEF sends the following attribute fields in the GPCC:

Service: Skype
Processes/Threads: Skype.exe.
ToS: 8
Action: Limit Bandwidth 128

In a seventh step, the user terminal will generate uplink traffic for the application Skype. In an eight step, PCEMF monitors skype.exe process and marks with 8 all uplink packets that correspond to this service attribute. In a ninth step, PCEF searches for this footprint (8) in the uplink packets. PCEF retrieves information of this uplink packet and stores it internally. The most useful information of this uplink packet is the flow to which this packet belongs, which may be composed of the following attributes:

Destination Port: Example: 2000
Source Port: Example 3000
Destination IP address: 100.100.100.100
Source IP address: 10.10.10.10
IP Protocol. TCP Furthermore, PCEF classifies this flow in PCC category 5 based on the detected footprint (8) and limits bandwidth for this application at 128. In association to the above information, PCEF also stores an information with respect to the PCC category for, this uplink packet.

Alternatively, the attribute fields in the GPCC may also already include the PCC category 5 for Skype such that uplink packet classification may be performed already at the user terminal by selecting an appropriate marker/footprint such that the PCEF does not have to perform any additional determination step of the PCC category based on the marker. In this case, the marker/footprint may thus be considered as the PCC category identifier or a combination of the PCC category identifier and the ToS value.

In a tenth step, the server answers the request of the user terminal and provides appropriate downlink packets.

In an eleventh step, the downlink packets are classified in PCEF according to the associated information stored the ninth step, i.e. information with respect to the PCC category and the same quintuple or flow: protocol, IP source, IP destination, source port and destination port:
Destination Port. Example: 2000
Source Port: Example 2000
Destination IP address: 10.10.10.10
Source IP address: 100.100.100.100
IP Protocol. TCP
Based on the above, PCEF classifies this flow of downlink packet in PCC category 5.

Here, the source attributes specified for the uplink flow in the ninth step are downlink traffic destination attributes and vice versa.

In a further twelfth step, PCEMF may then also classify downlink traffic according to the traffic received by this Skype.Exe process identified in the eight step.

EXAMPLE 4

The following shows other examples of detailed message flows according to the invention.

Figure 12:
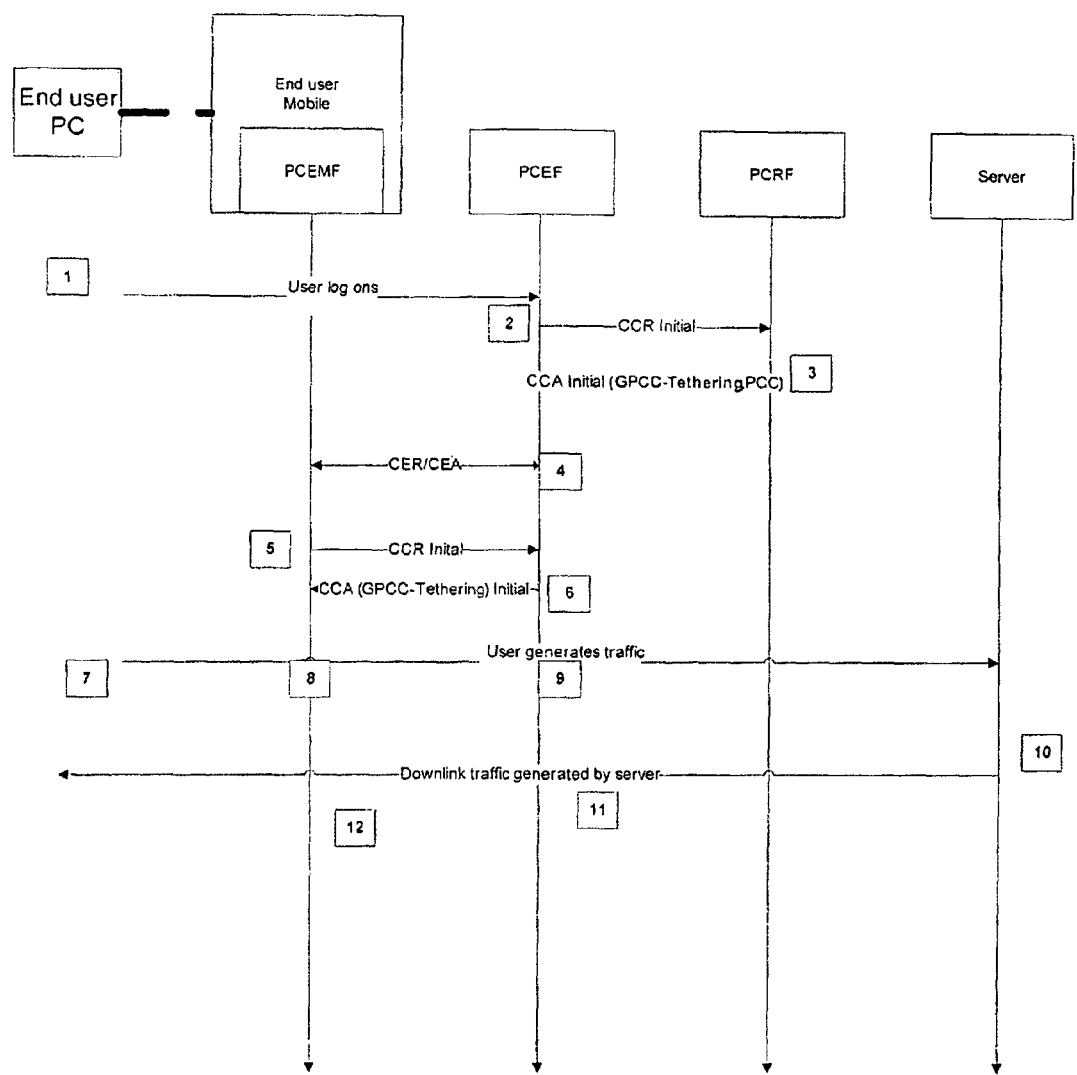
FIG. 12 illustrates a fourth example according to the present invention.

In particular, FIG. 12 shows an example of a tethering scenario, in which a user connects to the network using a user terminal, such as a mobile phone, that has installed a PCEMF.

Here, in a first step according to FIG. 12, the user logs on with a Personal Computer (PC) into the core packet network using a mobile phone (user terminal) which has installed a PCEMF software. It is further indicated that user terminal has a PCEMF installed with Windows Mobile operating system.

In a second step according to FIG. 12, PCEF sends an initial Credit-Control-Request (CCR) message to the PCRF with the Request-Type AVP set to INITIAL_REQUEST.

In a third step according to FIG. 12, the PCRF returns a Credit-Control-Answer (CCA) message to the PCEF. PCC rules and GPCC rules are sent towards PCEF. For this example, GPCC rules are composed of following fields:
Service: Tethering
Processes/Threads: no process.
PCC category: 25
ToS: 9
Action: none In addition, PCEF stores GPCC rules received. The GPCC of the example according to FIG. 12 indicates that traffic that does not correspond to the processes that are running in the mobile (user terminal) with PCEMF installed has to be marked accordingly.

In a fourth step according to FIG. 12, PCEMF will open a Diameter session against PCEF (Diameter CER/CEA). In a fifth step according to FIG. 12, PCEMF will open a Diameter session against PCEF, and PCEMF sends a CCR Initial Request towards PCEF requesting the GPCC rules. In a sixth step according to FIG. 12, PCEF will answers with successful CCA message (with a 2001 result code) and PCEF sends the following fields in the GPCC rules:
Service: Tethering
Processes/Threads: no process.
ToS: 9
Action: none In a seventh step according to FIG. 12, the end user generates uplink traffic from his PC for a specific service.

In an eight step according to FIG. 12, PCEMF detects that the user terminal is sending traffic (uplink packets) for an application that is not running in his mobile (user terminal) and marks with 9 all IP packets that corresponds to this traffic. Another method that may be usable for detecting tethering is checking which interface of the mobile (user terminal) is receiving this traffic, protocols using for connecting PC with mobile (user terminal), comparing Time to Live (TTL) parameter in IP header for a service that comes from PC with another in the mobile (user terminal).

In a ninth step according to FIG. 12, PCEF searches for this footprint (9) in the IP packets. PCEF gets information of this packet and stores it internally. Most useful information of this packet is the flow to which this packet belongs. It is composed of the following attributes:
Destination Port: Example: 4000
Source Port: Example 5000
Destination IP address: 200.100.100.100
Source IP address: 20.10.10.10
IP Protocol. TCP The PCEF classifies this flow in PCC category 25 based on the identified footprint (9) and generates some registers where operators can check this type of traffic.

In a tenth step according to FIG. 12, a server answers to the request of the end user (user terminal).

In an eleventh step according to FIG. 12, the downlink traffic (downlink packets) is classified in PCEF according to information stored (same quintuple or flow: protocol, IP source, IP destination, source port and destination port) in step 9:
Destination Port. Example: 5000
Source Port: Example 4000
Destination IP address: 20.10.10.10
Source IP address: 200.100.100.100
IP Protocol. TCP The PCEF also classifies this flow in PCC category 25 and generates some registers where operators can check this type of traffic.

It is to be noted again that source attributes specified for the uplink flow in step 9 are downlink traffic destination attributes and vice versa.

In a twelfth step according to FIG. 12, PCEMF may also classify downlink traffic (downlink packets) according to the traffic that is not handled by its internal process.

EXAMPLE 5

The following shows other examples of detailed message flows according to the invention.

Figure 13:
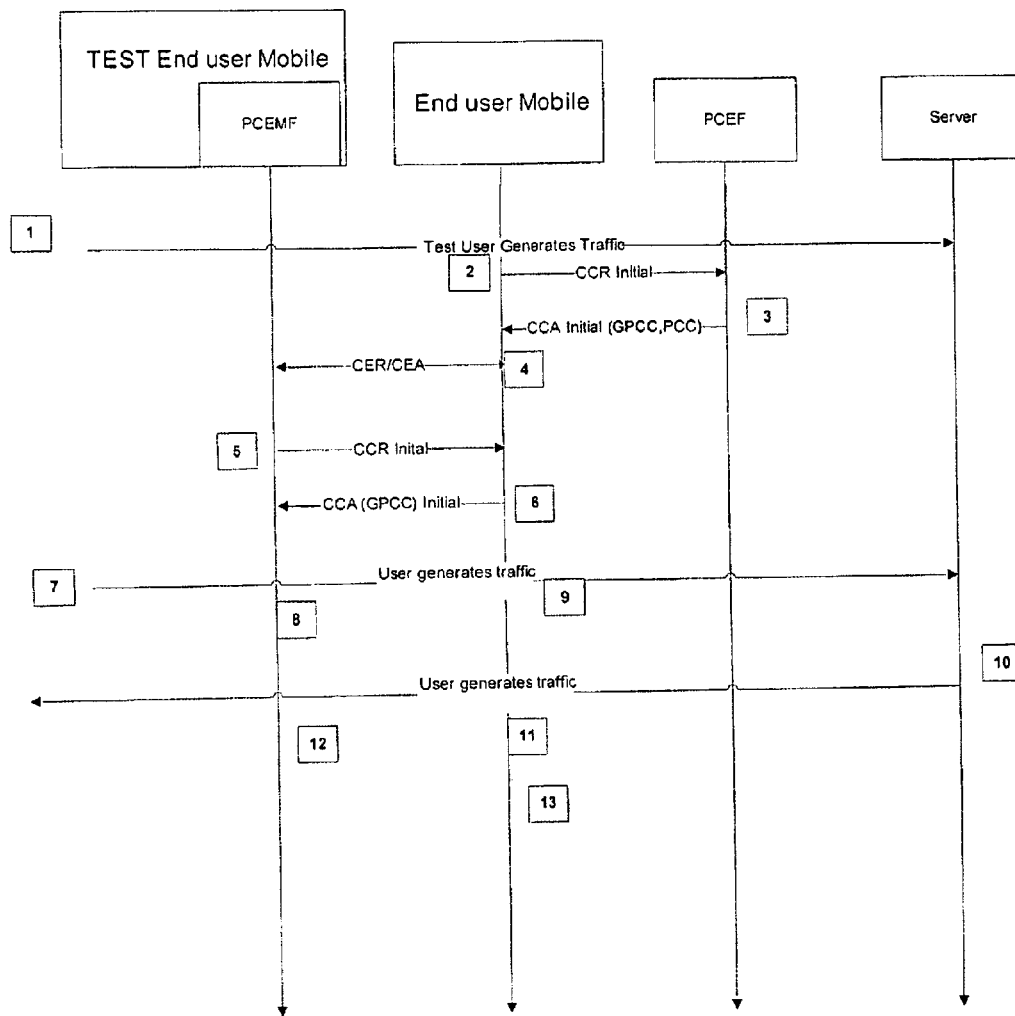
FIG. 13 and FIG. 14 illustrates a fifth example according to the present invention.
Figure 14:
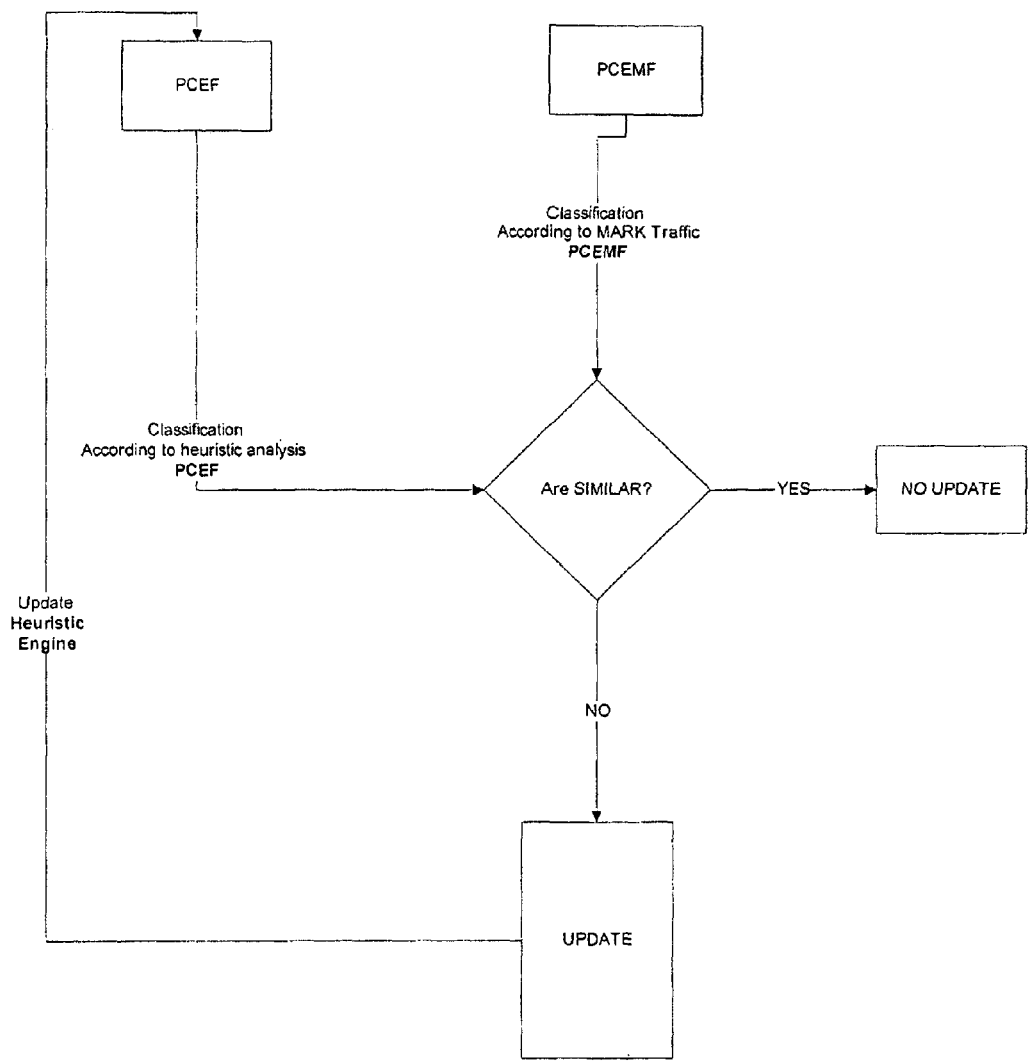

In particular, FIG. 13 and FIG. 14 show an example for updating and improving heuristic signatures. Diameter protocol has been chosen again as an example for the communication between PCEF and PCRF and also between the user terminal and PCRF.

In a first step according to FIG. 13, a test user of a user terminal, that is known and trustful, logs on into the core packet network. When the user terminal is connected to the network, a first IP-CAN session is established at a PCEF with DPI capabilities (PCEF-DPI) or an existing IP-CAN session is modified.

In a second step according to FIG. 13, PCEF sends an initial Credit-Control-Request (CCR) message to the PCRF with the Request-Type AVP set to INITIAL_REQUEST. A capability negotiation in Gx interface takes place with the PCRF to determine the proprietary features to be applied. Here as a further element of the invention, a new parameter could be included indicating that the PCEF also requests the GPCC rules corresponding to this user and the user specific mobile operating system. It may also include a parameter indicating that this user is trustful and can be selected for a better tuning of heuristics signatures.

In a third step according to FIG. 13, the PCRF returns a Credit-Control-Answer (CCA) message to the PCEF. PCC rules and GPCC rules are sent towards PCEF. Depending on the negotiated capabilities, the CCA message may further include some form of policy control decision, which determines the user access rights to the different services. PCEF stores the GPCC rules and PCC rules received.

In a fourth step according to FIG. 13, PCEMF will open a Diameter session against PCEF (Diameter CER/CEA). In a fifth step according to FIG. 13, PCEMF sends a CCR Initial Request requesting the GPCC rules. In a sixth step according to FIG. 13, PCEF will answer with CCA message with the corresponding error code (2001 if operation is successful and any other error code in the opposite case).

In a seventh step according to FIG. 13, the user terminal starts generating uplink traffic (uplink traffic) for a specific service. In an eight step according to FIG. 13, PCEMF monitors all processes/threads determined by service and process attributes in GPCC. PCEMF will identify this specific service and marks uplink packet with the value defined in ToS attribute in the GPCC rules.

In a ninth step according to FIG. 13, PCEF performs for this user terminal two types of analysis. In particular, PCEF analyzes traffic marked that comes from PCEMF. In addition, PCEF analyzes with its own detection engine which kind of traffic (uplink packets) this user terminal is generating.

According to the example shown in FIG. 14, PCEF compares two classification results, namely those which are derived from a PCEMF marking uplink packets and results that are derived from its own detection engine using heuristic analysis based on heuristic signatures. According to the result of this comparison, PCEF updates its own heuristic signatures. In particular, when the results are similar, indicating that both results lead to a similar or identical classification, it is determined that the heuristic signatures do not have to be updated. Conversely, when the results are not similar, indicating that both results lead to a different classification of packets, it is determined that the heuristic signatures have to be updated. One of several possible ways of updating heuristic signatures may be based on Machine Learning techniques like decision tree learning but other techniques may also be applied.

As a result of the constant update of the heuristic signature based on the analysis of the detection of the traffic of the users with PCEMF, traffic of other user terminals that do not have installed any PCEMF is going to be detected with a higher accuracy.

Then, in a tenth step according to FIG. 13, a server answers the request of end user. In an eleventh step according to FIG. 13, the downlink traffic is classified in PCEF according to information stored (same quintuple or flow: protocol, IP source, IP destination, source port and destination port) in step 8. Therefore PCEF classifies this traffic in the same PCC category as the packet/traffic of step 8. PCEF also analyzes the downlink traffic according to its own heuristics detection engine.

In a twelfth step according to FIG. 13, the downlink traffic may be also classified in PCEMF.

EXAMPLE 6

The following shows another example of detailed message flows according to the invention. According to this example, the method comprises the steps of:
a user with a user's terminal equipped with a PCEMF module establishing or modifying an IP-CAN session at a PCEF device, wherein the IP-CAN session includes an indicator indicating support for PCEMF at the user's terminal;

the PCEF device requesting to a PCRF server PCC rules to be installed at the PCEF device and GPCC rules to be installed at the PCEMF module;

the PCRF server submitting the PCC rules to be installed at the PCEF device and the GPCC rules to be installed at the PCEMF module, wherein the GPCC rules include: a service identifier for identifying a service, one or more thread identifiers for detecting the service when running in the user's terminal, a PCC category identifier for classifying the service, a watermark to be included in all traffic originated for the service, and indications of actions to be performed by the PCEMF module;

installing at the PCEF device the PCC rules and installing at the PCEMF module of the user's terminal the GPCC rules;

upon the user's terminal generating uplink traffic packets, the PCEMF module monitoring the threads and, upon detecting the service corresponding to the threads, marking the corresponding uplink traffic packets with the watermark for the service before submitting the uplink traffic packets to the PCEF device;

upon the PCEF device receiving the uplink traffic packets marked with the watermark, classifying the uplink traffic packets with the PCC category identifier and received quintuple (source IP address, source Port, destination IP address, destination Port and IP Protocol), applying PCC rules corresponding to the PCC category identifier, and submitting the uplink traffic packets towards a destination application server in charge of handling the service; and upon receiving at the PCEF device downlink traffic packets from the application server with a given quintuple, matching at the PCEF device the given quintuple with a previously received quintuple of the uplink traffic packets, and classifying the downlink traffic packets at the PCEF device with the PCC category classified for the previously received quintuple of the uplink traffic packets.

Advantageously, the user's terminal equipped with the PCEMF module may be used for testing purposes at the PCEF device in order to compare the results obtained by following the classification made by the PCEMF versus results obtained by directly classifying uplink traffic packets by the PCEF device alone.

In an embodiment of the invention, the GPCC rules along with the PCC rules are submitted from the PCRF server towards the PCEF device, and the latter provides the GPCC rules towards the PCEMF module either directly or upon request from the PCEMF module.

Advantageously, the PCEMF module can apply specific rules extracted from the GPCC rules for increasing or decreasing bandwidth.

Advantages of the Present Invention

This invention has several advantages with respect to the prior art as already discussed.

The present invention provides a concept to guarantee the fully identification of services and applications from a mobile device though a mobile network with no detection failure. In addition to the reduction of resources at a central entity of the mobile network, i.e. the PCEF, this may also allow charging this traffic and applying PCC functions in a safe and precise way, in particular for proprietary applications or protocols that only can be identified based on an heuristic analysis.

The concept is based on a mobile PCEF functionality that acts as an extension of PCEF capability on the mobile user terminal (PCEMF). The main function of PCEMF is identifying end user services/applications and marking them according to some global PCC rules (GPCC) initially downloaded from PCRF. Then, these marked packets may be identified easily for a PCEF that also has access to those configuration rules. Then, PCEF instead of performing heuristic analysis only would have to check a predetermined footprint in the packet with a dramatically less consuming CPU analysis, e.g. based on a shallow inspection (inspection based on some specific attributes in IP protocol). The downlink packets to the mobile user terminal may then be identified as packets that belong to the same flow as the marked uplink packets. This may guarantee a perfect and simple PCEF's detection. In particular, PCEF may identify with more accuracy any user mobile application at 100% success while applying only a shallow inspection that is efficient and quick. This may thus help alleviating a large bottleneck in the PCEF and therefore increases its capacity. With the concept of the present invention, the complexity of analysis of packets may thus be performed by several mobile nodes and is thus decentralized.

Moreover, according to the concept of the present invention, the PCEF network entity may save a lot of resources by applying the distributed PCEMF functionality on the mobile device. For example, the PCEF entity may increases its capacity by a factor of thousand since only a shallow inspection and detection, e.g. based on IP protocol should be needed to classify the traffic.

Moreover, since the PCEMF network entity may act as a extension of PCEF, in a near future when mobile devices with more computing power as graphic tables are used wider, PCEMF could be used to apply any PCC function sent from PCRF and so could replace any of the PCEF PCC functions, as for example dropping packets, limiting bandwidth, and/or applying parental control on some content types.

If PCEMF could apply local. PCC policies, as explained above, to restrict user traffic or increasing or decreasing the bandwidth in the own mobile device, then these policies could moreover be applied online according to a service operator notification in case of network congestion or other reasons.

The accuracy of detection of an application and/or service is increased in both cases: subscribers with PCEMF functionality and without PCEMF functionality for the following reasons:

Subscribers with PCEMF functionality are not using heuristic detection. Instead, the PCEMF module marks uplink packets for a specific application and/or service and so the PCEF entity has not to apply any heuristic algorithm to classify these packets. The heuristic algorithm has always a small error detection rate that can not be completely removed. With the PCEMF functionality, however, no false or positive detection errors can occur. For some heuristic protocols, the PCEF entity needs to classify that traffic after a period of time when traffic metrics are available. However using PCEMF capabilities, the PCEF entity can classify these application or protocols since the first packet is received without waiting to have traffic metrics.

For subscribers without PCEMF functionality, the PCEF entity has to apply heuristic algorithm to classify the packets. The heuristic algorithm has a small error detection rate that may be significantly improved according to the analysis of traffic at the user terminal with PCEMF functionality.

Moreover, the study about inspection/classification of heuristic application/protocols is simplified enormously. In particular, only a small investigation about what processes/threads belonged to a heuristic protocol/application is needed. Other traffic users without PCEMF capability installed are going to be inspected accurately thanks to the updates of heuristic signatures.

Furthermore, a service operator may apply PCC functions locally in a mobile device such as reducing bandwidth in case of network congestion and so save expensive radio resources.

A service operator may also charge user traffic based on the mobile applications running or even charge for applications downloaded from a software store. The end user can check easily which services are generating and how operators are charging those services.

The mobile operator has thus a, fully wide granularity in order to classify and to detect any mobile application that they want. The PCEMF entity could mark any mobile application or even any specific Bittorrent file download in order to apply a PCC function, e.g. increasing or decreasing bandwidth or dropping the download.

The present invention can therefore be used as an automatic and efficient tool to customize every user PCC solution. So once the user chooses a new commercial package or offers or discounts (from an operator's website or a customer center's call) the new tariff, bandwidth o QoS could be applied instantly with a minimal impact in the PCEF entity.

The PCEF entity may therefore apply any PCC rule instantly based on the GPCC rules.

Mobile users may be further able to prioritize in any instant what contents they consider that can be prioritized or dropped or delayed. A user could pay an extra free to download a HTTP/FTP/P2P file (eMule) in a very fast bandwidth or even to pay less money to download the same file in a very slow rate or to going browsing to a slow rate.

The mobile user may also report what webpages, services or applications could be allowed/forbidden for their children in any moment (parental control). They even could choose a time schedule where these tools are allowed/forbidden.

Network operators may therefore provide a better and efficient network that limits the bandwidth to the users offering a very low price and in any instant the end-users have the chance to increase that bandwidth for a specific file or contents paying an extra fee.

The present invention may be also used as a tool to interact with operator services online. Once the PCEMF module is installed in a mobile device, the operator could introduce some service intelligence to make offer/discount, which could be advertised using this tool and could be applied instantly.

In the above description, reference has been made to network entities (like PCEF network entity or PCRF network entity). It is noted that these entities can be indifferently implemented in one network node or in one network device; alternatively, they may be implemented in a plurality of network nodes or devices in which the necessary functionalities are distributed in a suitable way. Furthermore, reference has been made in the present description and claims to terms like determinator, transmitter, receiver, etc. . . . to indicate components of an entity performing certain functions. The implementation of these components can however be obtained by any suitable means (software, hardware or combinations thereof; distributed over several devices or concentrated in one device), such that the same terms are to be understood as, correspondingly, determining means, transmitting means, receiving means, etc. . . . . .

Moreover, as evident to the reader, the several embodiments and features thereof can be exchanged as necessary. The several examples may be further combined as necessary, as the reader would recognize that any combination thereof (or of parts thereof) is possible without any need to substantial modifications to what has been described.

The invention has been described in relation to particular embodiments and examples which are intended in all aspects to be illustrative rather than restrictive. Those skilled in the art will appreciate that many different combinations of hardware, software and firmware will be suitable for practicing the present invention. Moreover, other implementations of the invention will be apparent to those skilled in the art from consideration of the specification and practice of the invention disclosed herein. It is intended that the specification and the examples be considered as exemplary only. To this end, it is to be understood that inventive aspects lie in less than all features of a single foregoing disclosed implementation or configuration. Thus, the true scope of the invention is indicated by the following claims.

Where the terms like PCEF network entity, PCRF network entity, or the like are used herewith, no restriction is made regarding how distributed these elements may be and regarding how gathered elements may be. That is, the constituent parts of a unit or element or entity may be distributed in different software or hardware components or devices for bringing about the intended function. A plurality of distinct elements may also be gathered for providing the intended functionalities.

Any one of the above-referred entity of a network entity, or an element, or a network device, or a network node, etc. . . . may be implemented in hardware, software, field-programmable gate array (FPGA), application-specific integrated circuit (ASICs), firmware or the like.

In further embodiments of the invention, any one of the above-mentioned and/or claimed parts like PCEF network entity or PCRF network entity (this list being not exhaustive) may be replaced by corresponding means.

In the following, some of the abbreviations used in the present disclosure:
AVP Attribute Value Pair
CCR Credit Control Request
CCA Credit Control Answer
CN Core Network
DPI Deep Packet Inspection
DSCP Differentiated Services Code Point
HTTP Hyper Text Transfer Protocol
GPCC Global Policy and Charging Control
GPCCR Global Policy and Charging Control Repository
PC Personal Computer
PCC Policy and Charging Control
PCEF Policy Control Enforcement Function
PCEMF Policy Control Enforcement Mobile Function
PCRF Policy Control Resource Function
PPP Point to Point Protocol
QoS Quality of Service
ToS Type of Service
TTL Time To Live

The invention claimed is:

1. A method of classifying packets associated to at least one amongst a service and an application, the method carried out in a communication network comprising at least a user terminal and a Policy Control Enforcement Function, PCEF, network entity, the method comprising the steps of:

determining, at said user terminal, at least one execution indication indicating said at least one amongst said service and application being executed on said user terminal and generating uplink packets;

determining, at said user terminal and based on mobile Policy and Charging Control, PCC, rules available at said user terminal and said at least one execution indication, a marker for identifying at least one amongst a service and an application associated to said uplink packets;

transmitting, at said user terminal, said marker and said uplink packets, to said PCEF network entity;

determining an uplink classification, at said PCEF network entity, for received uplink packets based on said marker;

storing, at said PCEF network entity, an association between information related to an uplink flow corresponding to said uplink packets and said uplink classification;

receiving, at said PCEF network entity, downlink packets corresponding to said uplink packets;

determining a downlink classification, at said PCEF network entity, for received downlink packets based on said stored association.

2. The method according to claim 1, wherein the mobile PCC rules comprise at least one category identifier for classifying at least one amongst said at least one service and application; and wherein
the step of determining the marker comprises determining the marker as the category identifier corresponding to said identification.

3. The method according to claim 1, wherein said at least one execution indication is determined when execution of at least one thread corresponding to said at least one amongst said service and application is detected.

4. The method according to claim 1, wherein the mobile PCC rules comprise at least one category identifier, said at least one category identifier being in correspondence with PCC rules available at a PCEF network entity.

5. The method according to claim 1, wherein the step of determining said downlink classification includes matching information related to a downlink flow with said information related to said uplink flow, and determining said downlink classification as said uplink classification when a matching is detected.

6. The method according to claim 1, further comprising the step of
applying, at the PCEF network entity, PCC rules for said uplink packets according to said uplink classification.

7. The method according to claim 1, further comprising the step of
applying, at the PCEF network entity, PCC rules for said downlink packets according to said downlink classification.

8. The method according to claim 1, further comprising the steps of
determining, at said user terminal, a tethering indicating marker for uplink packets not being associated with one amongst a service and an application being executed on said user terminal;
transmitting, at said user terminal, said tethering indicating marker and said uplink packets not being associated with one amongst a service and an application being executed on said user terminal, to said PCEF network entity.

9. The method according to claim 1, further comprising the steps of comparing, at said PCEF network entity, said uplink classification with a heuristic classification obtained by directly classifying uplink packets with heuristic detection signatures;

updating, at said PCEF network entity, heuristic detection signatures, if the comparing determines that said uplink classification and said heuristic classification do not correspond.

10. A user terminal for classifying packets associated to at least one amongst a service and an application, said user terminal comprising circuitry and further adapted to communicate with a Policy Control Enforcement Function, PCEF, network entity, said user terminal comprising:

an execution determinator for determining at least one execution indication indicating said at least one amongst said service and application being executed on said user terminal and generating uplink packets;

a marker determinator for determining, based on mobile Policy and Charging Control, PCC, rules available at said user terminal and said at least one execution indication, a marker for identifying at least one amongst a service and an application associated to said uplink packets;

a transmitter for transmitting said marker and said uplink packets, to a PCEF network entity.

11. The user terminal according to claim 10, wherein the mobile PCC rules comprise at least one category identifier for classifying at least one amongst said at least one service and application; and wherein the marker determinator is adapted to determine the marker as the category identifier corresponding to said identification.

12. The user terminal according to claim 10, wherein said execution determinator is further adapted to determine said at least one execution indication when execution of at least one thread corresponding to said at least one amongst said service and application is detected.

13. The user terminal according to claim 10, wherein the mobile PCC rules comprise at least one category identifier, said at least one category identifier being in correspondence with PCC rules available at a PCEF network entity.

14. A method for classifying packets associated to at least one amongst a service and an application, said method carried out at a user terminal, the method comprising the steps of:

determining at least one execution indication indicating said at least one amongst said service and application being executed on said user terminal and generating uplink packets;

determining, based on mobile Policy and Charging Control, PCC, rules available at said user terminal and said at least one execution indication, a marker for identifying at least one amongst a service and an application associated to said uplink packets;

transmitting said marker and said uplink packets, to a Policy Control Enforcement Function, PCEF, network entity.

15. The method according to claim 14, wherein the mobile PCC rules comprise at least one category identifier for classifying at least one amongst said at least one service and application; and wherein the step of determining the marker comprises determining the marker as the category identifier corresponding to said identification.

16. The method according to claim 14, wherein said at least one execution indication is determined when execution of at least one thread corresponding to said at least one amongst said service and application is detected.

17. The method according to claim 14, wherein the mobile PCC rules comprise at least one category identifier, said at least one category identifier being in correspondence with PCC rules available at a PCEF network entity.

18. A Policy Control Enforcement Function, PCEF, network entity adapted to perform policy and charging enforcement functions, said PCEF network entity comprising circuitry and further adapted to communicate with a user terminal capable of executing at least one amongst a service and an application, said PCEF network entity comprising:

an uplink receiver for receiving, from said user terminal entity, uplink packets and a marker, said marker for identifying said at least one amongst a service and an application associated to said uplink packets, said marker being determined by said user terminal entity based on mobile Policy and Charging Control, PCC, rules available at said user terminal entity and on at least one amongst said service and application being executed on said user terminal;

an uplink classification determinator for determining an uplink classification for received uplink packets based on said marker;

a memory for storing an association between information related to an uplink flow corresponding to said uplink packets and said uplink classification;

a downlink receiver for receiving downlink packets corresponding to said uplink packets;

a downlink determinator for determining a downlink classification, at said PCEF network entity, for received downlink packets based on said stored association.

19. The PCEF network entity according to claim 18, wherein said downlink determinator is further adapted to match information related to a downlink flow with said information related to said uplink flow, and to determine said downlink classification as said uplink classification when a matching is detected.

20. The PCEF network entity according to claim 18, further comprising a unit for applying PCC rules for said uplink packets according to said uplink classification.

21. The PCEF network entity according to claim 18, further comprising a unit for applying PCC rules for said downlink packets according to said downlink classification.

22. A method for performing policy and charging enforcement functions, said method carried out at a Policy Control Enforcement Function, PCEF, network entity adapted to communicate with a user terminal capable of executing at least one amongst a service and an application, said method comprising the steps of:

receiving, from said user terminal entity, uplink packets and a marker, said marker for identifying said at least one amongst a service and an application associated to said uplink packets, said marker being determined by said user terminal entity based on mobile Policy and Charging Control, PCC, rules available at said user terminal entity and on at least one amongst said service and application being executed on said user terminal;

determining an uplink classification, at said PCEF network entity, for received uplink packets based on said marker;

storing, at said PCEF network entity, an association between information related to an uplink flow corresponding to said uplink packets and said uplink classification;

receiving, at said PCEF network entity, downlink packets corresponding to said uplink packets;

determining a downlink classification, at said PCEF network entity, for received downlink packets based on said stored association.

23. The method according to claim 22, wherein the step of determining said downlink classification includes matching information related to a downlink flow with said information related to said uplink flow, and determining said downlink classification as said uplink classification when a matching is detected.

24. The method according to claim 22, further comprising the step of applying, at the PCEF network entity, PCC rules for said uplink packets according to said uplink classification.

25. The method according to claim 22, further comprising the step of applying, at the PCEF network entity, PCC rules for said downlink packets according to said downlink classification.

26. A Policy and Charging Rules Function, PCRF, network entity adapted for performing policy and charging rules function, said PCRF network entity comprising circuitry and further adapted to communicate with at least one amongst a Policy Control Enforcement Function, PCEF, network entity and a user terminal, said PCRF network entity comprising:

a generating unit for generating Policy and Charging Control, PCC, rules to be used at a PCEF network entity and mobile PCC rules to be used at a user terminal, said mobile PCC rules comprising mobile PCC rules and guidelines for allowing a user terminal to determine whether at least one amongst a service and an application is executed on said user terminal entity, and for allowing a user terminal to determine a marker for identifying said at least one amongst a service and an application associated to uplink packets; and a transmitter for transmitting said PCC rules and said mobile PCC rules to at least one amongst a PCEF network entity and a user terminal.

* * * * *